United States Patent
Weiss

(10) Patent No.: US 7,171,287 B2
(45) Date of Patent: Jan. 30, 2007

(54) SYSTEM AND METHOD FOR PLANNING ENERGY SUPPLY AND INTERFACE TO AN ENERGY MANAGEMENT SYSTEM FOR USE IN PLANNING ENERGY SUPPLY

(75) Inventor: Anton Weiss, Altdorf (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/733,492

(22) Filed: Dec. 10, 2003

(65) Prior Publication Data

US 2004/0167677 A1  Aug. 26, 2004

(51) Int. Cl.
*G05D 9/00* (2006.01)
(52) U.S. Cl. .................. 700/291; 700/286; 705/37; 705/412
(58) Field of Classification Search .......... 705/37, 705/412; 700/291, 295, 286, 297, 90
See application file for complete search history.

(56) References Cited

U.S. PATENT DOCUMENTS

| | | | | |
|---|---|---|---|---|
| 5,794,212 A * | 8/1998 | Mistr, Jr. | ..................... | 705/26 |
| 6,178,362 B1 * | 1/2001 | Woolard et al. | ............ | 700/295 |
| 6,281,601 B1 * | 8/2001 | Edelman et al. | ............. | 307/29 |
| 6,343,277 B1 * | 1/2002 | Gaus et al. | .................. | 705/37 |
| 6,598,029 B1 * | 7/2003 | Johnson et al. | ............... | 705/37 |
| 6,732,019 B2 * | 5/2004 | Spool et al. | ................ | 700/291 |
| 6,785,592 B1 * | 8/2004 | Smith et al. | ................ | 700/291 |

FOREIGN PATENT DOCUMENTS

DE    196 12 776 A1    10/1997
EP    0 895 333 A2    2/1999

OTHER PUBLICATIONS

Robinson et al. "Development of the Intercontrol Center Communications Protocol (ICCP)". Power Industry Computer Application Conference, 1995. Conference Proceedings., 1995 IEEE On pp. 449-455.*
English language translation for European Patent No. 0 895 333 A2.
English language translation for German Patent No. 196 12 776 A1.

* cited by examiner

*Primary Examiner*—Leo Picard
*Assistant Examiner*—Alexander Kosowski
(74) *Attorney, Agent, or Firm*—White & Case LLP

(57) ABSTRACT

A system for planning energy supply for energy consumers includes a first sub-system operatively associated with an energy coordinating body, such as an energy management system, and second sub-systems operatively associated with corresponding energy suppliers, such as power plants. A global communication network, such as the Internet, is employed between the first and second sub-systems. Each of the sub-systems includes an interface for exchanging energy planning information between the sub-systems and for negotiating an energy supply specification from the energy supplier to the energy consumers.

22 Claims, 11 Drawing Sheets

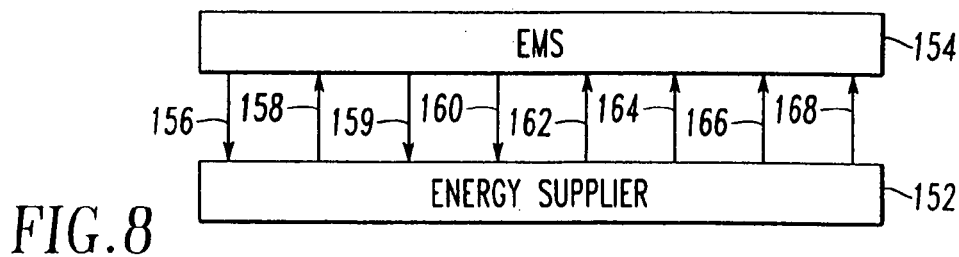

FIG.8

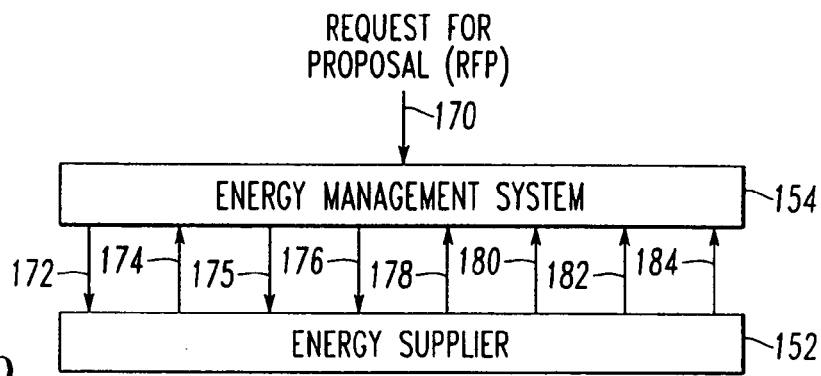

FIG.9

| ATTRIBUTE | TYPE OF VALUE | IMPORTANCE |
|---|---|---|
| PRICE PER UNIT | CURVE | 1.8 |
| REQUIRED POWER PROFILE | CURVE | 1.5 |
| PRICE FOR FREQUENCY STABILITY | CURVE | 1.2 |
| PRICE FOR OVER/UNDERLOAD | CURVE | 1.3 |
| PRICE FOR AVAILABILITY | CURVE | 1 |
| REACTIVE POWER | PHASE LIMIT | 0.9 |
| NOISE | % | 1000 |
| PRICE FOR "PREPARE TO COMMIT INTERVAL" | CURVE | 0.8 |
| PRICE FOR MAXIMUM DISTANCE | CURVE | 0.5 |
| PRICE FOR LOAD TAKEOVER | CURVE | 0.5 |
| "GREEN POWER" | % | 0.2 |
| PRICE FOR EARLY START OF DELIVERY | CURVE | 0.1 |
| PRICE FOR LOAD RELEASE | CURVE | 0.1 |

FIG.10

*FIG.11A*
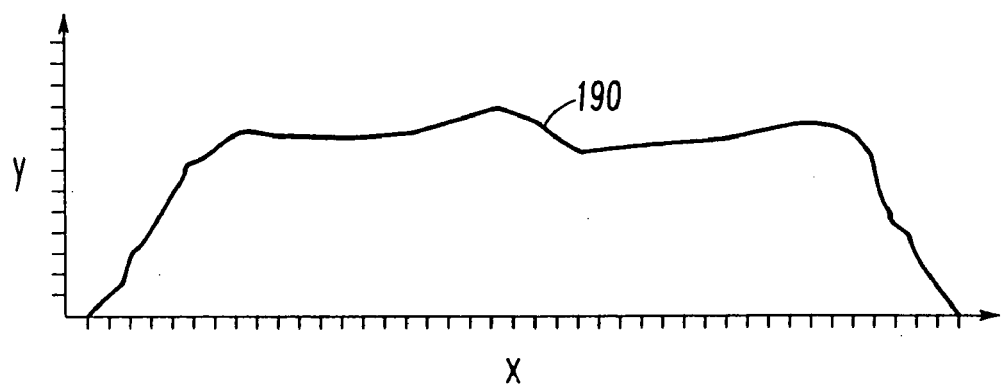
*FIG.11B*
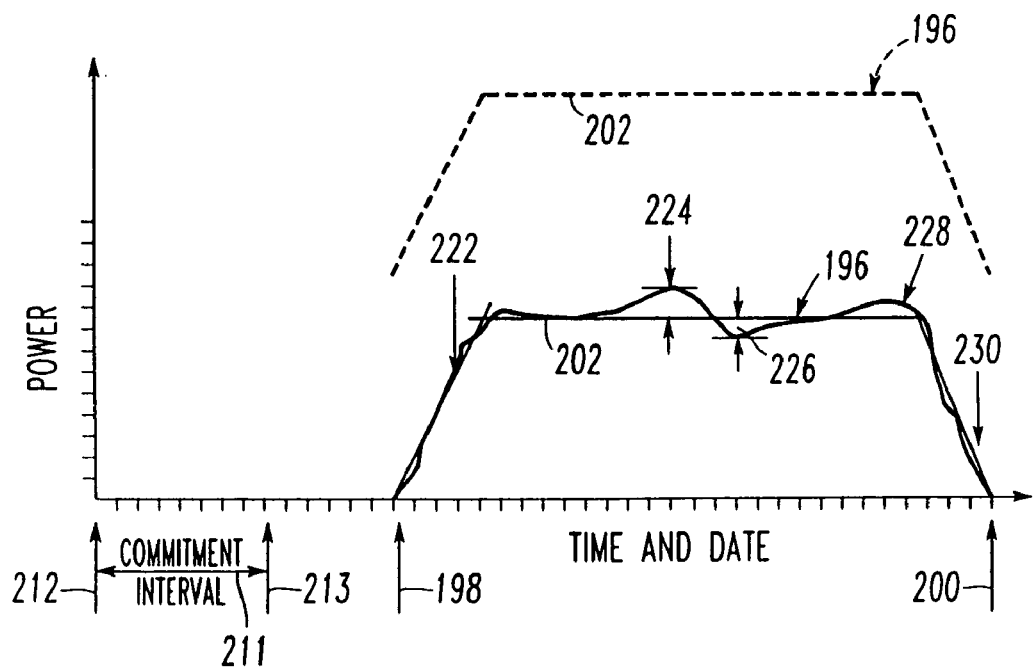
*FIG.12*

PRICE FOR "PREPARE TO COMMIT"

PRICE FOR "FREQUENCY STABILITY"

PRICE FOR "LOAD TAKEOVER/RELEASE"

PRICE FOR "EARLY START OF DELIVERY"

PRICE FOR AVAILABILITY

PRICE FOR "OVERLOAD/UNDERLOAD"

PRICE FOR "MAXIMUM DISTANCE"

PRICE PER UNIT

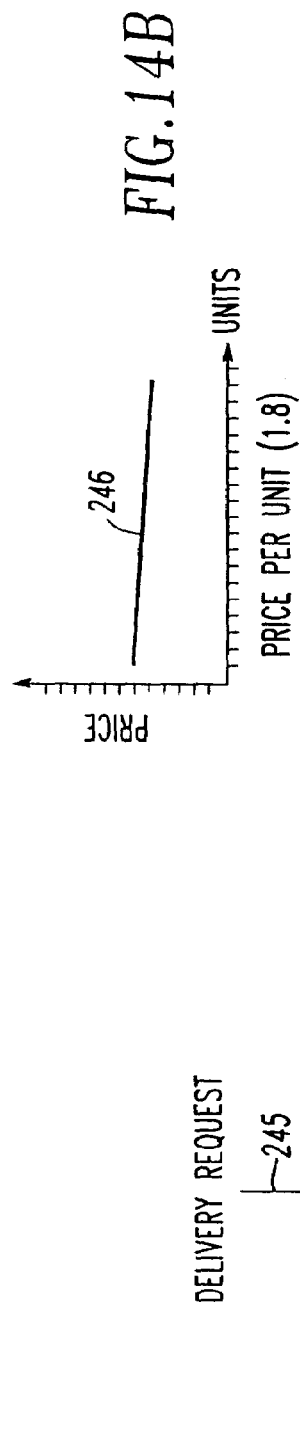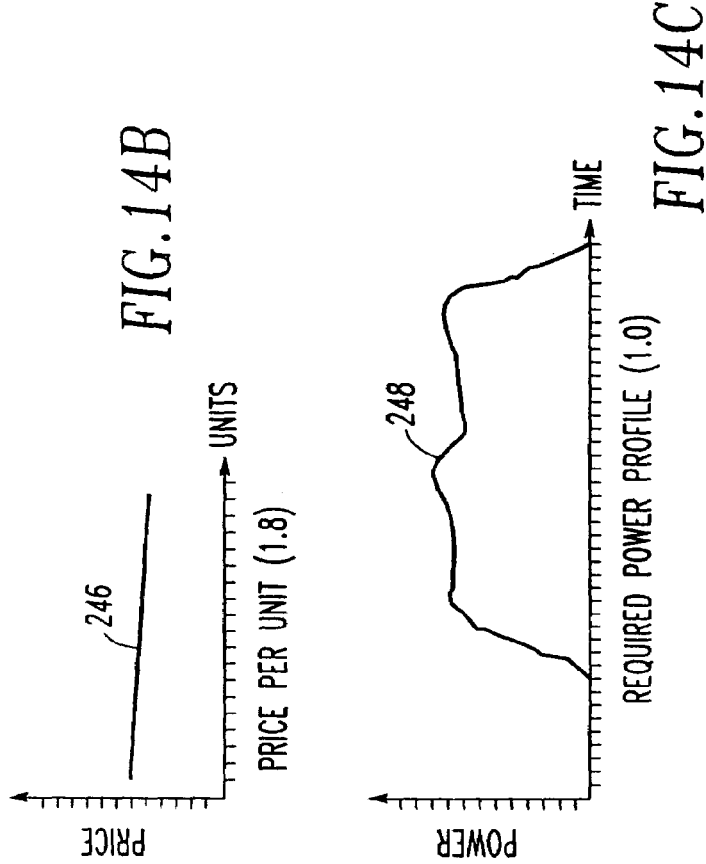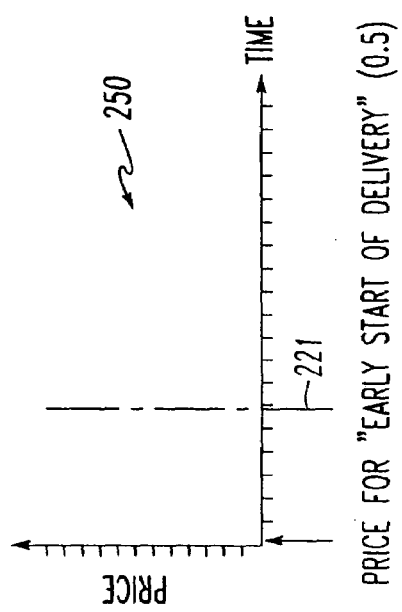

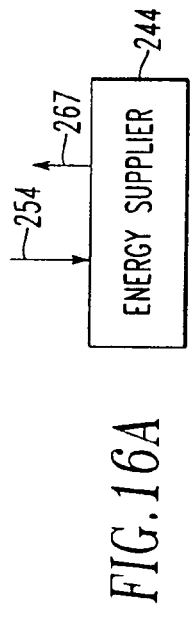
FIG.15A
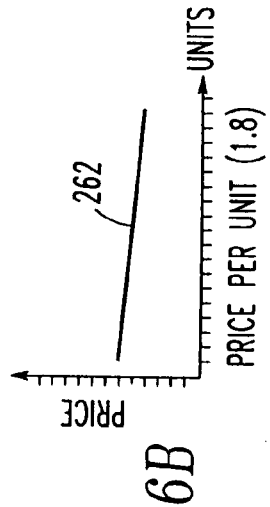
FIG.15B
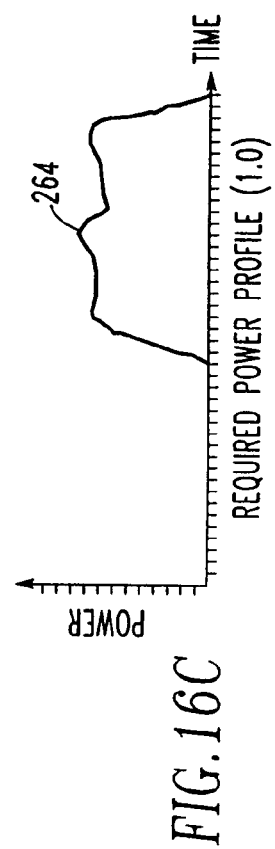
FIG.15C
FIG.15D
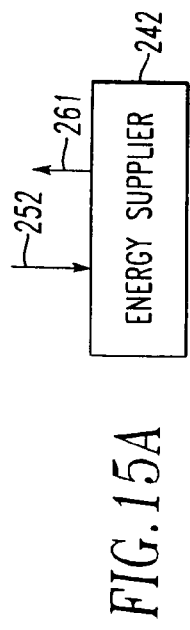
FIG.16A
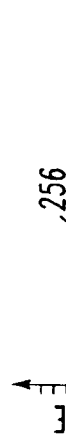
FIG.16B
FIG.16C
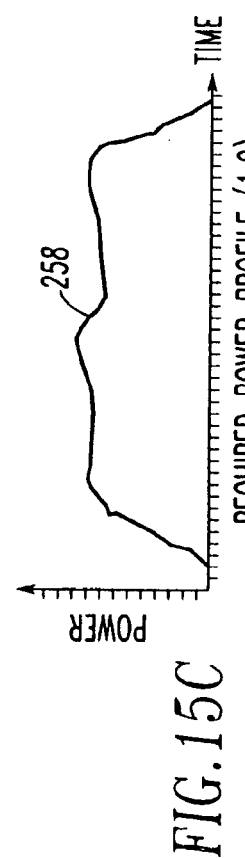
FIG.16D
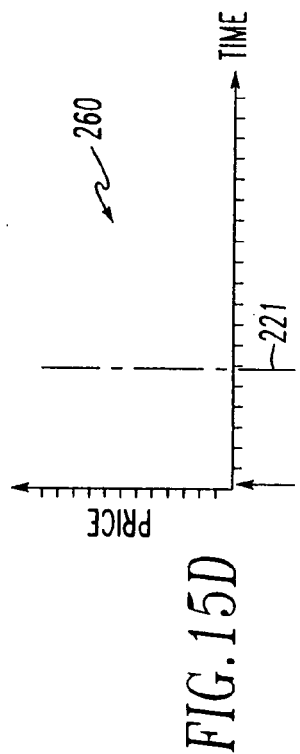

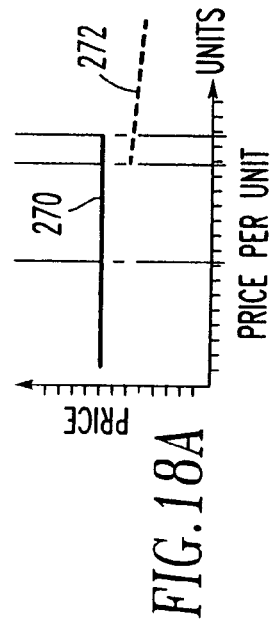
FIG. 17A
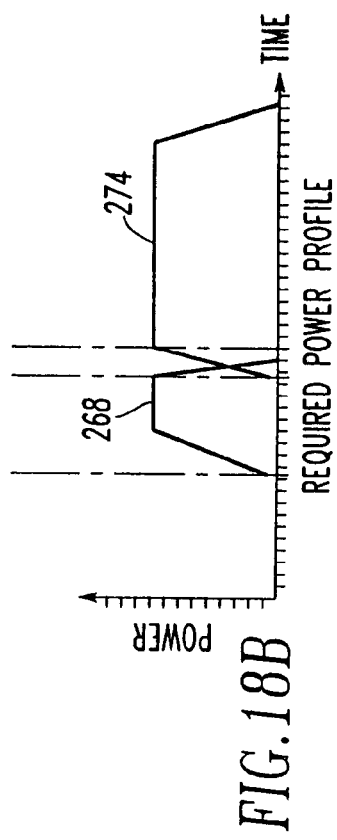
FIG. 17B
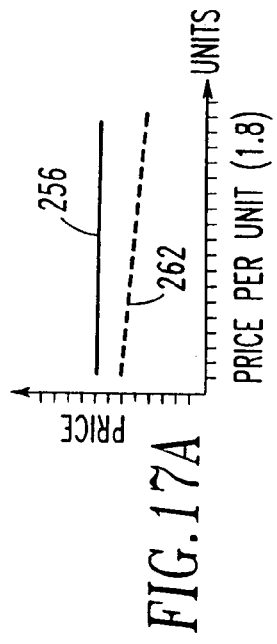
FIG. 18A
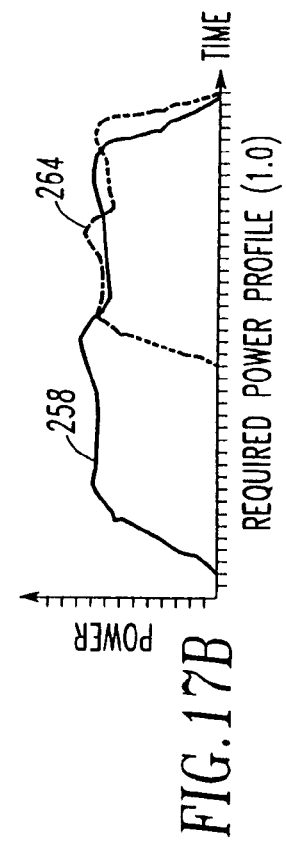
FIG. 18B
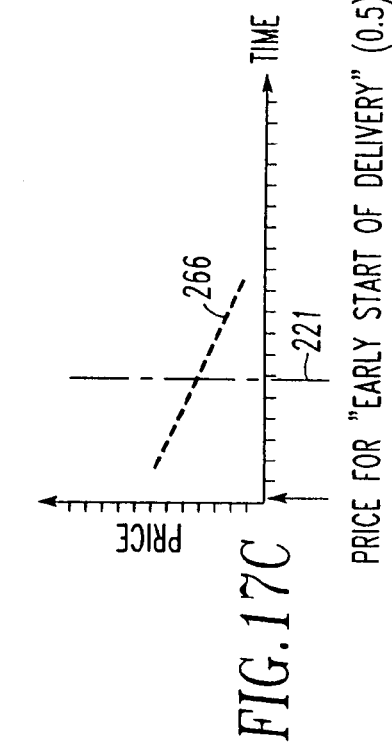
FIG. 17C
FIG. 18C

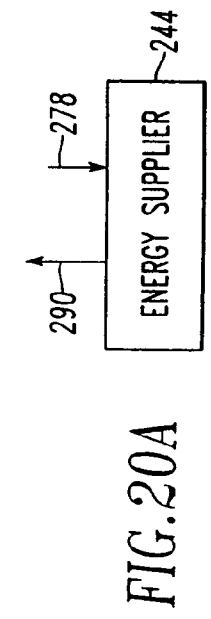
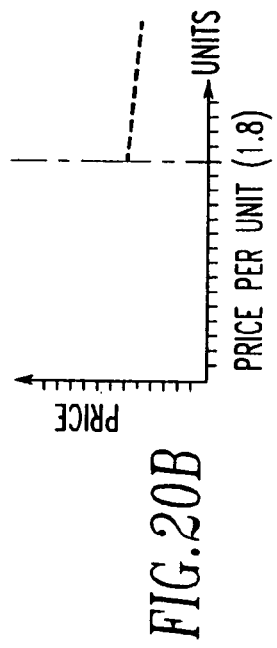
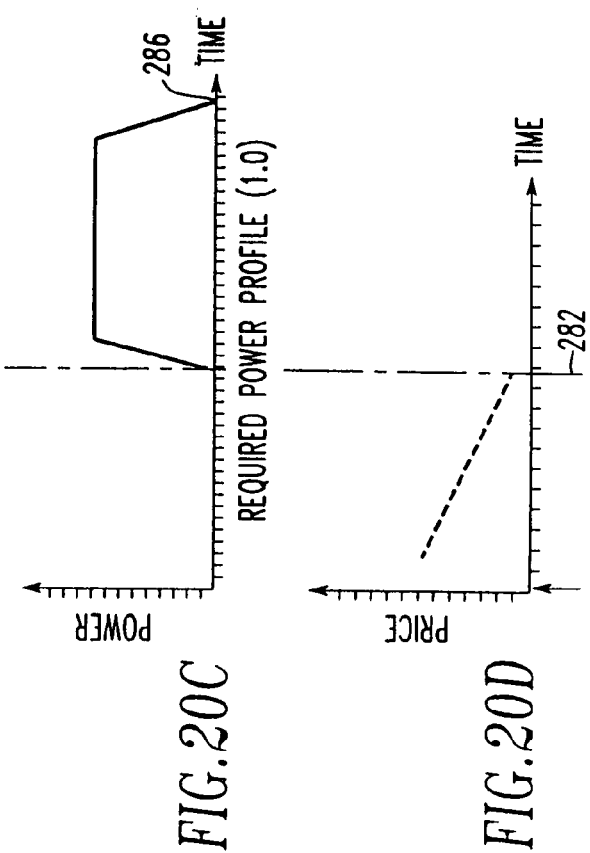
FIG.19A  FIG.19B  FIG.19C  FIG.19D
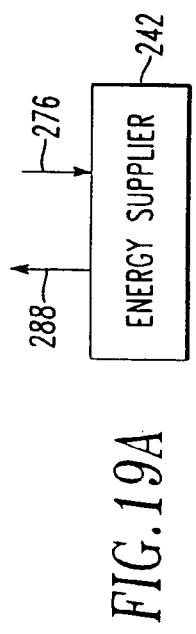
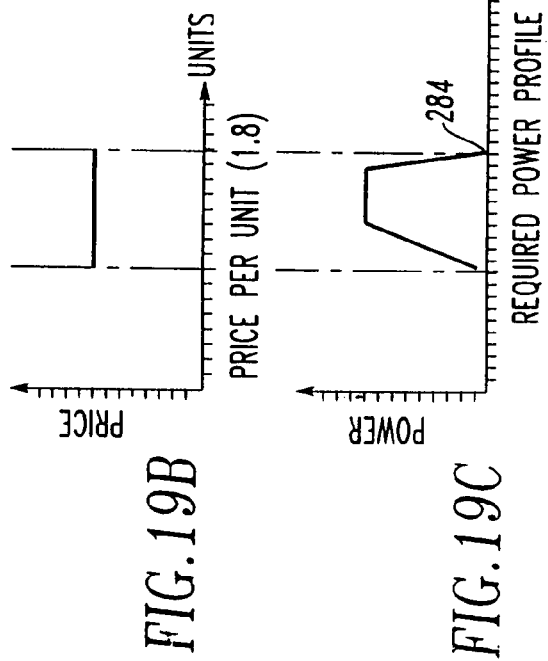
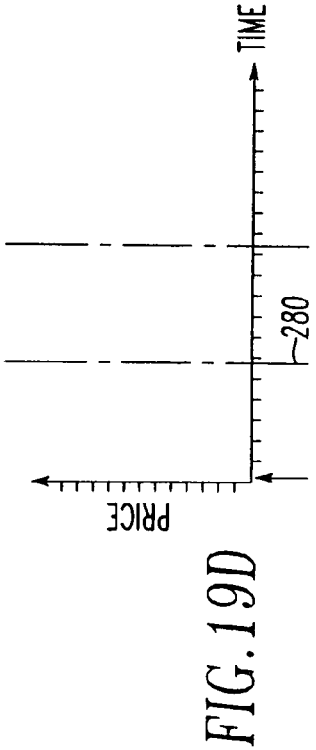
FIG.20A  FIG.20B  FIG.20C  FIG.20D

SYSTEM AND METHOD FOR PLANNING ENERGY SUPPLY AND INTERFACE TO AN ENERGY MANAGEMENT SYSTEM FOR USE IN PLANNING ENERGY SUPPLY

This application claims the benefit, under 35 U.S.C. § 120, of patent application Ser. No. 09/671,916, filed Sep. 28, 2000, the contents of which are incorporated by reference herein in their entirety.

BACKGROUND OF THE INVENTION

1. Field of the Invention

The invention relates to a system for planning energy supply and, more particularly, to such a system for negotiating an energy supply specification with one or more energy suppliers for energy consumers. The invention also relates to a method for planning energy supply. The invention further relates to an interface to an energy management system for use in planning energy supply.

2. Background Information

If several energy suppliers join forces, then more profitable service might be provided through a skillful combination of the performance of the individual energy suppliers. This would, however, require the utilization of knowledge of parameters that influence the cost/benefit relationship for the individual energy supplier's output. Nevertheless, these parameters can vary significantly from one energy supplier to the next (e.g., depending on power plant construction, age). Therefore, such skillful combination would need to employ in-depth information of the internal processes of the individual energy suppliers. Such information may not be known or not be made available because it is proprietary and, thus, kept secret. This limits the capability of optimally deploying individual energy suppliers in an overall plan.

Currently, known planning computers provide "energy schedules" and accounting information for delivered amounts of energy for individual power plants. These energy schedules or targets are typically derived from experiential values, since the potential production of each individual power plant is well known. Consequently, the individual power plants deliver the required output or, alternatively, report faults. For single-point centralized planning and fixed service offerings of only a relatively small count of power plants, this paradigm is probably satisfactory. However, when one or more power plants provide energy for different energy service/output buyers at the same time or in series, this task can no longer be performed satisfactorily in a centralized manner. From the point of view of control technology, this represents a provision/availability process, not a control process, as no closed control loop exists. Therefore, automated optimization cannot take place in this manner alone (i.e., without additional knowledge). Accordingly, output reserves inherent in power plants cannot be utilized.

Currently, individual power plants are locally optimized (e.g., based upon knowledge of operating ratios (i.e., a ratio of actual utilization (au) compared to possible utilization (pu); for economical operations, an operating ratio (au/pu) close to 1 is highly desirable); types of machinery). The electric utility industry, being the largest user of real-time data in the world, has generated a proliferation of communication protocols that were created on an as-needed basis over the years. However, these protocols are posing technical and economic problems due to the growth of national and international power pools and regional centers, and increases in utility data communication applications. Therefore, an international standard protocol has become necessary.

The standards for planning power plant performance/output are designed for a directives based order principle. See, for example, Inter-Control Center Communications Protocol (ICCP) User's Guide: Revision 1, EPRI Report TP-113804, September 1999.

ICCP is also known as the Telecontrol Application Service Element (IEC TASE.2). ICCP is an ISO standard protocol for real-time data exchange within the electric power utilities industry. Many utilities are now applying the Telecontrol Application Service Element.2 (TASE.2), the international standard protocol, for communication of real-time data.

ICCP allows data exchange over wide area networks (WANs) or local area networks (LANs), and uses Manufacturing Messaging Specification (MMS) messages and ICCP objects over OSI or TCP/IP to exchange critical utility data. ICCP provides consistent, standardized inter-utility and intra-utility data exchange by establishing procedures and rules for data exchange. ICCP facilitates the exchange of power system data; real-time monitoring and control; the exchange of historical, scheduling, and energy accounting data; and the exchange of operator messages. With ICCP, utilities may exchange data between plural control center EMS systems, with the NERC inter-regional Security Network, between EMS and distribution SCADA systems, between EMS and power plant DCS systems, between EMS and other utility systems, and between EMS/SCADA and substations.

The ICCP architecture is based on the seven-layer OSI model, and employs MMS for messaging services in layer seven. ICCP is an application built on top of MMS in the upper sublayer of OSI layer seven. Many ICCP implementations only run over OSI.

The ICCP standard foresees a "schedule" object, a "Transfer account" object, and "Transfer Account Conditions". The Transfer account is a matrix structure, in which the content of the columns is user defined and the values can be floating point or integer. An ICCP server monitors the data to detect when conditions become true and then generates and transfers the account information. The formatting of the data is application specific, which is tagged with a Transfer Account Reference Number.

It is known to employ ICCP to transfer energy scheduling data for power plants. For example, ICCP Block 8 energy scheduling data may be exchanged by employing LiveData ICCP servers marketed by LiveData, Inc. of Cambridge, Mass. The LiveData ICCP server runs over OSI or TCP/IP or both simultaneously. For example, the LiveData ICCP server can maintain ICCP communications to one peer using OSI and to another peer using TCP/IP, simultaneously.

In one application, Block 8 energy scheduling (e.g., hourly scheduling data) and accounting information is transferred from one energy management system (EMS) across a communications infrastructure through two ICCP servers to another EMS on a separate network. It is also known to employ other protocols, such as WSCC, for such transfers.

It is further known to employ ICCP to facilitate data exchange between utility control centers, power pools, regional control centers and non-utility generators.

The Internet comprises a vast number of computers and computer networks that are interconnected through communication links. The interconnected computers exchange information using various services, such as electronic mail (i.e., e-mail), and the World Wide Web ("WWW"). The WWW service allows a server computer system (e.g., a web server, a web site) to send graphical web pages of information to a remote client computer system. The remote client computer system can then display the web pages. Each resource (e.g., computer, web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends that web page to the client computer system. When the client computer system receives that web page, it typically displays the web page using a browser. A browser is a special-purpose application program that effects the requesting of web pages and the displaying of web pages.

Currently, web pages are typically defined using extensible mark-up language (XML) or HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

There is room for improvement in systems and methods for use in energy planning.

SUMMARY OF THE INVENTION

This need and others are satisfied by the present invention, which is directed to a system and method for planning energy supply for energy consumers. In accordance with the invention, an energy coordinating body or bodies, such as energy management systems of an energy alliance, and energy suppliers connected therewith are provided with an interface for the exchange of planning data and also with an algorithm for controlling power plant output and/or the selection of partial energy services, in order to provide a total energy supply service package. This algorithm works roughly like an "exchange" and negotiates energy supply and demand in a format that enables automated optimization starting from a mixture of local optimization (within each of the energy suppliers) and global optimization (within the alliance of energy management systems). Since this solution makes it possible to support decentralized energy planning and settlement, it is particularly suitable for "deregulated energy markets" with multiple energy suppliers and multiple energy consumers.

In accordance with one aspect of the invention, a system for planning energy supply for energy consumers comprises: a first sub-system operatively associated with at least one energy coordinating body; a second sub-system operatively associated with at least one energy supplier; and a communication network between the first sub-system and the second sub-system, wherein each of the first and second sub-systems includes an interface for exchanging energy planning information between the sub-systems and for negotiating an energy supply specification from the at least one energy supplier to the energy consumers.

The communication network may be a global communication network, such as the Internet.

The communication network may include a first local area network and a first ICCP server operatively associated with the first sub-system, a second local area network and a second ICCP server operatively associated with the second sub-system, and a global communication network between the first and second ICCP servers.

The first and second sub-systems may include a processor, and the interface of each of the first and second sub-systems may provide communications between the processors for automated optimization of energy supply planning. Each of the interfaces may exchange at least two messages between the first and second sub-systems, with the messages being related to negotiation of an energy supply specification from the at least one energy supplier for the energy consumers.

A first pair of the messages may include a request for a proposal for the energy supply specification from the first sub-system to the second sub-system, and a proposal in response to the request for a proposal from the second sub-system to the first sub-system.

A second pair of the messages may include an offer for an energy supply specification in response to the proposal from the first sub-system to the second sub-system, and an acceptance of the offer from the second sub-system to the first sub-system.

As another aspect of the invention, a system for planning energy supply for energy consumers comprises: a first sub-system operatively associated with a first energy management system; a plurality of second sub-systems, each of the second sub-systems being operatively associated with a corresponding second energy management system; and a communication network between the first sub-system and the second sub-systems, wherein each of the first and second sub-systems includes an interface for exchanging energy planning information between the sub-systems and for negotiating an energy supply specification for the energy consumers.

As a further aspect of the invention, a system for planning energy supply for energy consumers comprises: a first sub-system operatively associated with an energy supplier having a plurality of energy sources; a plurality of second sub-systems, each of the second sub-systems being operatively associated with a corresponding one of the energy sources; and a communication network between the first sub-system and the second sub-systems, wherein each of the first and second sub-systems includes an interface for exchanging energy planning information between the sub-systems and for negotiating an energy supply specification for the energy consumers.

As another aspect of the invention, a system for use by at least one energy coordinating body and a plurality of energy suppliers or energy management systems to plan energy supply for energy consumers comprises: means for receiving requests related to a proposed energy supply for the energy consumers; means for generating requests for energy planning proposals responsive to the received requests and related to a proposed energy supply from each of the energy suppliers or the energy management systems; means for generating energy planning proposals responsive to the requests for energy planning proposals from the energy suppliers or the energy management systems to the at least one energy coordinating body; means for determining an efficient energy supply specification from the energy suppliers or the energy management systems responsive to the energy planning proposals; means for generating energy planning offers responsive to the efficient energy supply specification for at least some of the energy suppliers or the energy management systems; and means for generating acceptances responsive to the energy planning offers from each of the at least some of the energy suppliers or the energy management systems to the at least one energy coordinating body.

The means for determining an efficient energy supply specification may include means for generating an energy supply specification for each of the energy suppliers or the energy management systems, with the energy supply specification including a plurality of energy supply sub-specifications having an attribute with a value and an importance value; means for determining a metric for each of the attributes; means for multiplying the importance value and the metric to determine an importance-adjusted attribute metric for each of the attributes; and means for adding the importance-adjusted attribute metrics for determination of the efficient energy supply specification from the energy suppliers.

As a further aspect of the invention, an energy planning system for planning energy supply from a plurality of energy suppliers for energy consumers comprises: a communication interface to the energy suppliers; a processor operatively associated with the communication interface; a first routine executed by the processor for exchanging energy planning information through the communication interface between the processor and the energy suppliers; and a second routine executed by the processor for negotiating an energy supply specification from the energy suppliers to the energy consumers.

The first routine may exchange at least two messages between the processor and a corresponding one of the energy suppliers, with the messages being related to the negotiated energy supply specification.

As a further aspect of the invention, an energy planning interface to an energy management system for use in planning energy supply from an energy supplier for energy consumers comprises: a communication interface to the energy management system; a processor operatively associated with the communication interface; a first routine executed by the processor for exchanging energy planning information through the communication interface between the processor and the energy management system; and a second routine executed by the processor for negotiating an energy supply specification from the energy supplier to the energy consumers.

As another aspect of the invention, a method of planning energy supply comprises: employing at least one energy coordinating body; employing at least one energy supplier; receiving and coordinating requests for energy at the at least one energy coordinating body; exchanging energy planning information related to the requests for energy between the at least one energy coordinating body and the at least one energy supplier; and negotiating an energy supply specification responsive to the requests for energy and from the at least one energy supplier.

As a refinement, the method further comprises: employing one energy coordinating body as the at least one energy coordinating body; employing a plurality of energy suppliers as the at least one energy supplier; generating requests for proposals for the energy supply specification from the energy suppliers related to the requests for energy; receiving the proposals; evaluating the received proposals to select at least some of the energy suppliers; and forming contracts between the one energy coordinating body and the at least some of the energy suppliers for the energy supply specification.

As a still further refinement, the method further comprises: including a specification of energy services to be provided with the proposals for the energy supply specification; and, for each of the energy suppliers: receiving and evaluating the specification of energy services, determining whether the specification of energy services can be supplied, calculating pricing for the specification of energy services, and preparing a corresponding one of the proposals for the energy supply specification.

As another aspect of the invention, a method of planning energy supply comprises: employing at least one energy coordinating body; employing at least one energy supplier; receiving requests for energy from a global communication network at the at least one energy coordinating body; employing the global communication network to exchange energy planning information related to the requests for energy between the at least one energy coordinating body and the at least one energy supplier; and employing the global communication network to negotiate an energy supply specification from the at least one energy supplier and responsive to the requests for energy.

BRIEF DESCRIPTION OF THE DRAWINGS

A full understanding of the invention can be gained from the following description of the preferred embodiments when read in conjunction with the accompanying drawings in which:

FIG. 8 is a block diagram showing the interface between an energy supplier and an energy management system;

FIG. 9 is a block diagram showing further details for the interface between the energy management system and the energy'supplier of FIG. 8;

FIG. 10 shows exemplary attributes, values and importance values for the request for proposal, proposal, offer and contract specification of FIGS. 8 and 9;

FIGS. 11A and 11B show plot and tabular representations, respectively, of a curve;

FIG. 12 is a plot or curve showing the amount of power versus time and date;

FIG. 14A is a block diagram of exemplary parties to a negotiation, including an energy management system and two energy suppliers;

FIGS. 14B–14D are plots of various price curves employed for negotiation by the energy management system of FIG. 14A;

FIG. 15A is a block diagram of the first energy supplier of FIG. 14A;

FIGS. 15B–15D are plots of various price curves employed by the first energy supplier in the negotiation with the energy management system of FIG. 14A;

FIG. 16A is a block diagram of the second energy supplier of FIG. 14A;

FIGS. 16B–16D are plots of various price curves employed by the second energy supplier in the negotiation with the energy management system of FIG. 14A;

FIGS. 17A–17C are combined plots of the price curves of FIGS. 15B–15D and 16B–16D, respectively;

FIGS. 18A–18C are optimized plots as determined by the energy management system of FIG. 14A for the combined plots of the price curves of FIGS. 17A–17C, respectively;

FIGS. 19A and 20A show the offers to and the reports from the energy suppliers of FIGS. 15A and 16A, respectively;

FIGS. 19B–19D and 20B–20D show the resulting offers as determined by the energy management system of FIG. 14A from the optimized plots of FIGS. 18A–18C, respectively.

DESCRIPTION OF THE PREFERRED EMBODIMENTS

As employed herein, the term "energy supplier" shall expressly include, but not be limited to, one or more electric power plants, nuclear power plants, fossil power plants, hydroelectric power plants, solar power plants, wind farms, and/or geothermal power plants.

As employed herein, the term "person" shall expressly include, but not be limited to, a natural person, firm, corporation, association, group or organization.

As employed herein, the term "energy consumer" shall expressly include, but not be limited to, a person, a facility, and/or a business entity which consumes energy, either directly or indirectly, from an energy supplier.

As employed herein, the term "energy management system" shall expressly include, but not be limited to one or more persons, facilities, and/or business entities which coordinate, broker, sell and/or distribute energy from one or more energy suppliers to one or more energy consumers and/or other energy management systems.

As employed herein, the term "energy coordinating body" shall expressly include, but not be limited to, one or more energy management systems.

As employed herein, the term "communication network" shall expressly include, but not be limited to, any local area network (LAN), wide area network (WAN), intranet, extranet, global communication network, and the Internet.

As employed herein, the term "negotiating" shall expressly include, but not be limited to, "arranging for or bringing about through exchange of information and compromise". Negotiation deals with the goal of forming at least one contract between two or more involved parties. Negotiations can fail; in this case, no contract is achieved. The purpose of a contract is to exchange deliverable(s) of economic value for mutual benefit. Negotiation takes place by a set of information exchanges (involving information primitives) where such information describes the deliverables in a way that the involved parties completely understand (in the context of their shared business) and expresses the value associated with these deliverables as perceived by the involved parties.

Figure 1:
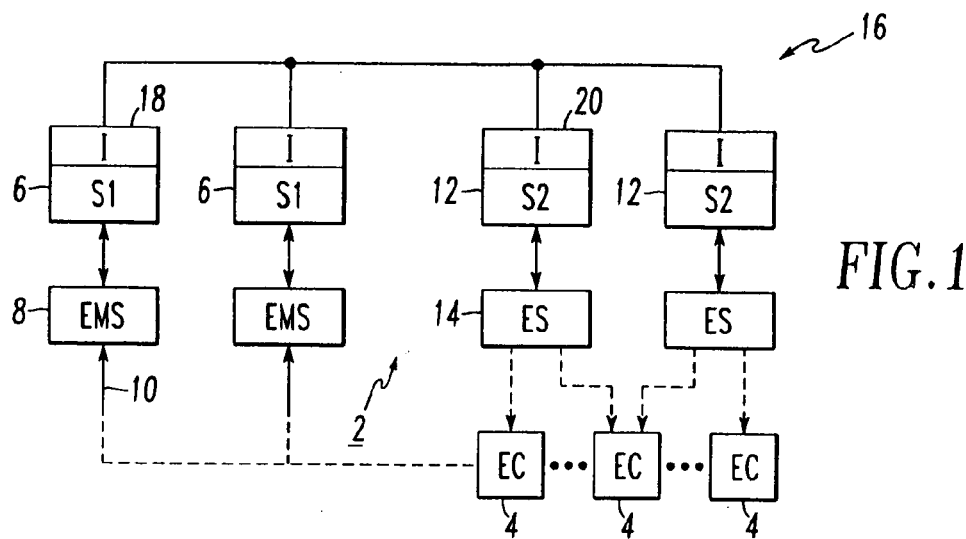
FIG. 1 is a block diagram of a system for planning energy supply for energy consumers in accordance with the present invention.

FIG. 1 shows a system 2 for planning energy supply for energy consumers (EC) 4. The system 2 includes one or more first sub-systems (S1) 6 each of which is operatively associated with a corresponding energy coordinating body, such as the exemplary energy management system (EMS) 8. The EMS 8 receives and coordinates one or more requests 10 for energy.

The system 2 also includes one or more second sub-systems (S2) 12 each of which is operatively associated with a corresponding energy supplier (ES) 14. The ES 14, in turn, supplies energy to one or more of the energy consumers 4. A suitable communication network 16 is disposed between the first and second sub-systems 6 and 12, which include interfaces (I) 18 and 20, respectively, for exchanging energy planning information (EPI) 21 (shown in FIG. 2A) related to the requests 10 for energy between the sub-systems 6,12 and for negotiating an energy supply specification responsive to the requests 10 for energy from the energy suppliers 14 to the energy consumers 4.

Requests for energy are generated by energy consumers (EC) 4 and directed to energy coordinating bodies 8. Delivery of energy is directed from energy suppliers (via an energy distribution mechanism (not shown)) to the ECs 4. The EMS 8 may bundle many requests for energy or handle those requests one at a time (which is not as economical for small amounts of energy).

Figure 2A:
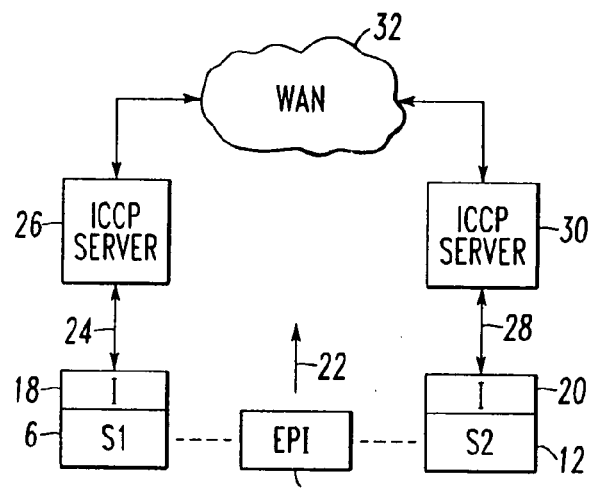
FIG. 2A is a block diagram of a communication network for the system of FIG. 1 in accordance with one embodiment of the present invention.

FIG. 2A shows a communication network 22 for the system 2 of FIG. 1. The exemplary communication network 22 includes a first local area network 24 and a first Inter-Control Center Communications Protocol (ICCP) server 26 operatively associated with the first sub-system 6, and a second local area network 28 and a second ICCP server 30 operatively associated with the second sub-system 12. The network 22 also includes a suitable communication network, such as the exemplary wide area network (WAN) 32, between the first and second ICCP servers 26,30. Alternatively, the server 26 (30) and the sub-system 6 (12) may be implemented by one processor.

Figure 2B:
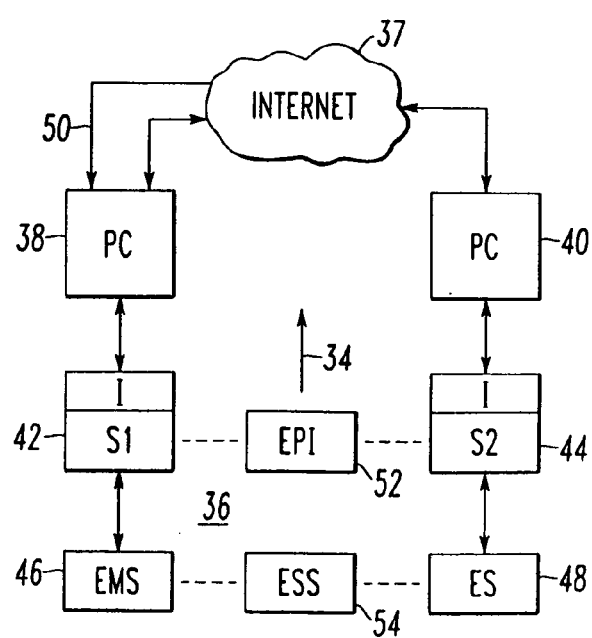
FIG. 2B is a block diagram of a communication network for a system for planning energy supply in accordance with another embodiment of the present invention.

FIG. 2B shows another communication network 34 for a system 36 for planning energy supply. The exemplary communication network 34 employs a global communication network, such as the Internet 37, and personal computers (PCs) 38 and 40 to provide communication between the respective first and second sub-systems 42 and 44. The first sub-system 42 is operatively associated with energy management system 46, and the second sub-system 44 is operatively associated with energy supplier 48. The PC 38 receives requests 50 for energy from the Internet 37 and forwards the same to the energy management system 46. The PCs 38 and 40 also employ the Internet 37 to exchange energy planning information 52 related to the requests 50 for energy between the energy management system 46 and the energy supplier 48, respectively. The energy management system 46 and the energy supplier 48 further employ the Internet 37 to negotiate an energy supply specification (ESS) 54 from the energy supplier 48 and responsive to the requests 50 for energy. The PCs 38, 40 may employ, for example, CGI-scripts or Java Servlets for communications.

Although exemplary PCs 38,40 are shown, any suitable server system may be employed, which includes one or more PCs and/or servers and/or any combination of hardware or software that can initiate requests and respond to requests over a global communication network, such as the Internet. Alternatively, any suitable processor such as, for example, network- or web-PCs, microcomputers, microprocessors, workstations, minicomputers or mainframe computers may be employed.

The PCs 38,40 may be connected to the Internet 37 by one or more Internet service providers (ISPs) (not shown). Also, at least one of the exemplary PCs 38,40 may support the display of one or more web pages (not shown).

Figure 3:
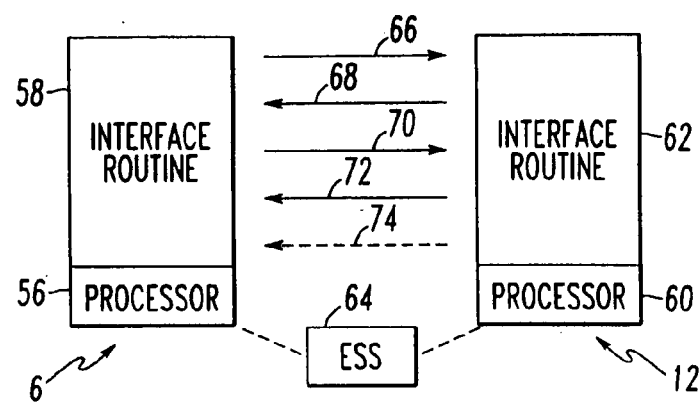
FIG. 3 is a block diagram of two sub-systems of the system of FIG. 1.

FIG. 3 shows additional details of the sub-systems 6,12 of FIG. 1. The sub-system 6 includes a suitable processor 56 and an interface routine 58, and the sub-system 12 includes a suitable processor 60 and a corresponding interface routine 62. The interface routines 58,62 provide communications between the respective processors 56,60 and through the respective exemplary ICCP servers 26,30 of FIG. 2A for automated optimization of energy supply planning. In accordance with the invention, the interface routines 58,62 exchange one or more pairs of messages between the sub-systems 6,12, with the messages being related to negotiation of an energy supply specification 64 from the energy supplier 14 for the energy consumers 4 of FIG. 1.

A first pair of the messages includes a request message 66 for a proposal for the energy supply specification 64 from the first sub-system 6 to the second sub-system 12, and a proposal message 68 in response to the request message 66 from the second sub-system 12 to the first sub-system 6. The proposal message 68 may either accept or modify the requested energy supply specification 64.

A second pair of the messages includes an offer message 70 (an "order" for energy) from the first sub-system 6 to the second sub-system 12 for an energy supply specification in response to the proposal message 68, and an acceptance message 72 of the offer message 70 from the second sub-system 12 to the first sub-system 6. The offer message 70 may either accept the proposed energy supply specification or offer modification(s) thereto.

Alternatively, the second sub-system 12 may provide a counter offer message 74 to the first sub-system 6 for a modification to the offered energy supply specification.

Figure 4:
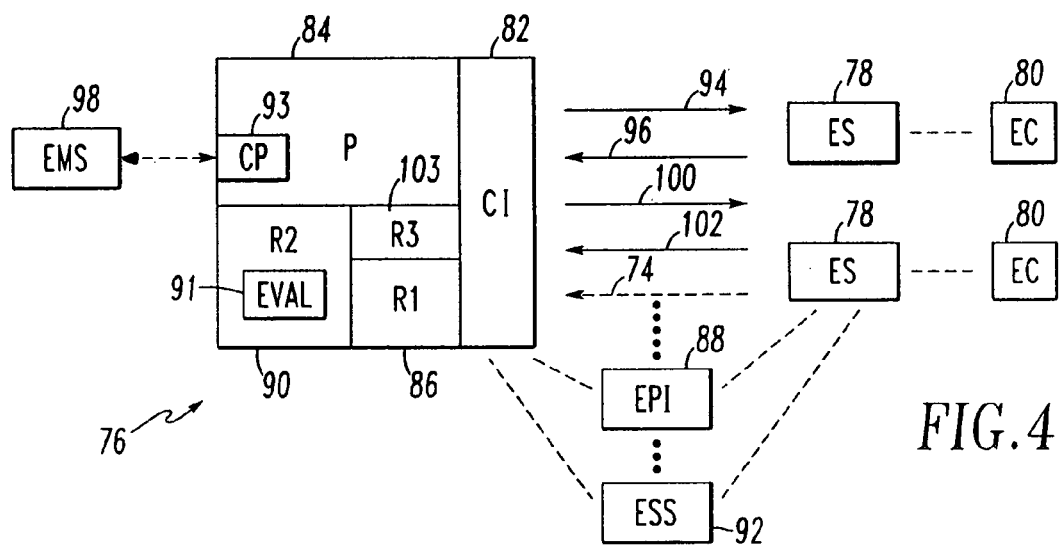
FIG. 4 is a block diagram of an energy planning system in accordance with another embodiment of the invention.

FIG. 4 shows an energy planning system 76 for planning energy supply from a plurality of energy suppliers 78 (or other energy management systems) for energy consumers 80. The energy planning system 76 includes a suitable communication interface (CI) 82 to the energy suppliers 78, and a processor (P) 84 (and memory for EPI 88, ESS 92, and messages) operatively associated with the interface 82. The processor 84 executes a first routine (R1) 86 for exchanging energy planning information 88 (e.g., in messages 94,96, 100,102,74) through the interface 82 between the processor 84 and the ESs 78. The processor 84 also executes a second routine (R2) 90 for negotiating an energy supply specification 92 from the energy suppliers 78 (on behalf of the energy consumers 80).

The suitable processor interface, such as a communication port (CP) 93 (which may be part of the CI 82), receives requests for the energy management system 98 (e.g., from the requests 10 of FIG. 1) related to a proposed energy supply for the energy consumers 80. Similar to the interface routine 58 of FIG. 3, the first routine 86 generates requests for energy planning proposals (responsive to the requests 10 which may be of the same form as the EPI 88) and related to a proposed energy supply from each of the energy suppliers or other energy management systems 78, and exchanges at least two messages between the processor 84 and a corresponding one of the energy suppliers 78, with the messages being related to the negotiated energy supply specification 92. The first routine 86 generates a request message 94 for a proposal for the energy supply specification 92 from the energy suppliers 78 related to requests for energy. The first routine 86 also receives a proposal message 96 for the same or modified energy supply specification 92 from the energy suppliers 78.

In accordance with the present invention, the second routine 90 determines an efficient energy supply specification from the energy suppliers 78 responsive to the energy planning proposal message 96. In particular, the second routine 90 evaluates the received proposal messages 96 from the energy suppliers 78. The second routine 90 also forms contract(s) between the energy management system 98 and at least one of the energy suppliers 78 for the energy supply specification 92 by sending offer messages 100 (orders for energy from the EMS 98 to the ES(s) 78) to each of the energy supplier(s) 78, and by receiving acceptance message(s) 102 (or counter offer message(s) 74 as shown in FIG. 3) therefrom.

Figure 5:
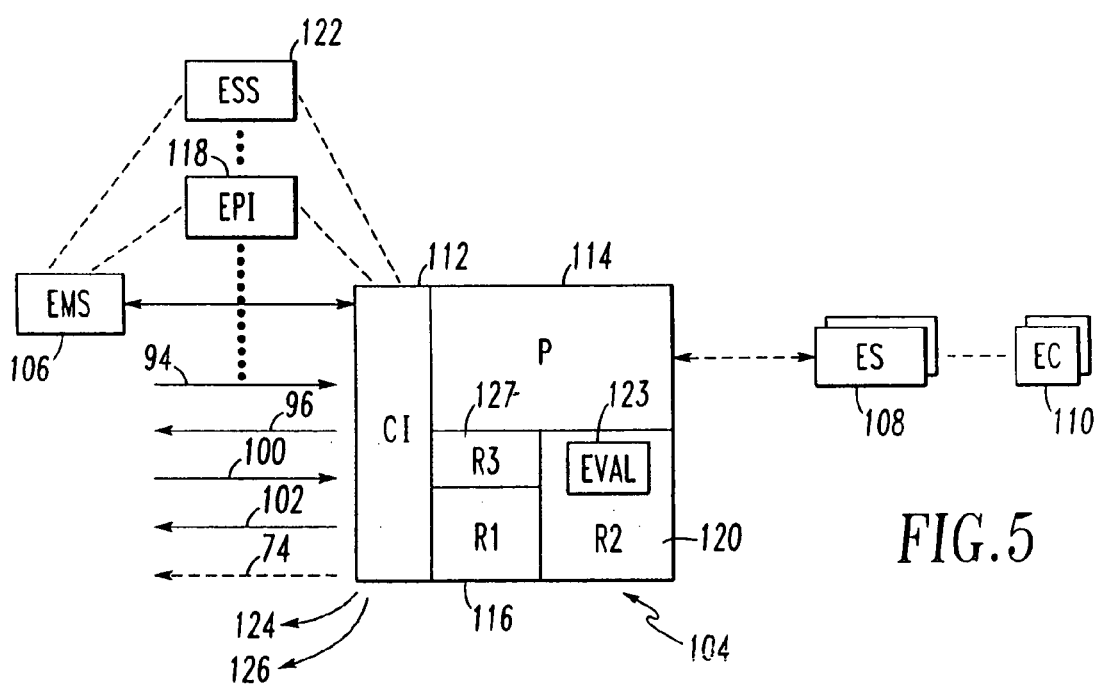
FIG. 5 is a block diagram of an energy planning interface to an energy management system in accordance with another embodiment of the present invention.

A third routine (R3) 103 generates the energy planning offer message 100 responsive to the efficient energy supply specification 92 for the energy suppliers 78 (each of which preferably employs the energy planning interface 104 of FIG. 5).

FIG. 5 shows an energy planning interface 104 to an energy management system 106 for use in planning energy supply from one or more energy supplier(s) 108 for energy consumers 110. The exemplary interface 104 includes a communication interface 112 to the energy management system 106, and a processor 114 (and memory for EPI 118, ESS 122, and messages) operatively associated with the interface 112. The processor 114 executes two software routines including a first routine 116 for exchanging energy planning information 118 (e.g., in messages 94,96,100, 102,74) through the interface 112 between the processor 114 and the energy management system 106, and a second routine 120 for negotiating an energy supply specification 122 from the energy supplier(s) 108 (on behalf of energy consumers 110). The EMS 106 may represent a set of energy consumers 110 and treat them as an anonymous energy super-consumer.

The exemplary energy planning interface 104 may be used, for example, in combination with the energy planning system 76 of FIG. 4 (or with the sub-system 6, the interface routine 58, and the messages 66,68,70,72,74 of FIG. 3) to provide a system for use by the energy management systems 98,106 and the energy suppliers 108 of FIG. 5 or other energy management systems 78 to plan energy supply for the energy consumers 80,110. Thus, the first routine 116 exchanges at least two messages 94,96 and/or 100,102 between the processor 114 and the energy management system 106, with these messages being related to the negotiated energy supply specification 122.

The second routine 120 generates the energy planning proposal message 96 responsive to the request message 94. In particular, the second routine 120 receives and evaluates the specification of energy services included with the request message 94 for the proposal for the energy supply specification 122, determines whether the specification of energy services can be supplied, calculates pricing for the specification of energy services, and prepares the proposal message 96 for the same or modified energy supply specification. The second routine 120 employs a suitable evaluation (EVAL) routine 123 for this purpose. The second routine 120 performs similar functions in connection with the offer message 100. On the one hand, a contract is formed between the energy management system 106 and the energy supplier 108 with the sending of the acceptance message 102. On the other hand, further negotiation may be needed to form a corresponding contract between those parties after the sending of the counter offer message 74. Regardless, the first routine 116 includes an appropriate specification of energy services to be provided with the messages 96,102,74.

After a contract is formed, the one or more energy supplier(s) 108 supplies energy to the energy consumers 110 based upon the final energy supply specification 122. In turn, the first routine 116 sends a report message 124 to provide a report on the performance of the energy supply contract. If needed, a variance message 126 is sent to report any variance between the corresponding final energy supply specification 122 and the energy as supplied to the consumers 110. A third routine (R3) 127 executed by the processor 114 generates the acceptance message 102 responsive to the energy planning offer message 100. The EMS 106 preferably employs the system 76 of FIG. 4.

Figure 6:
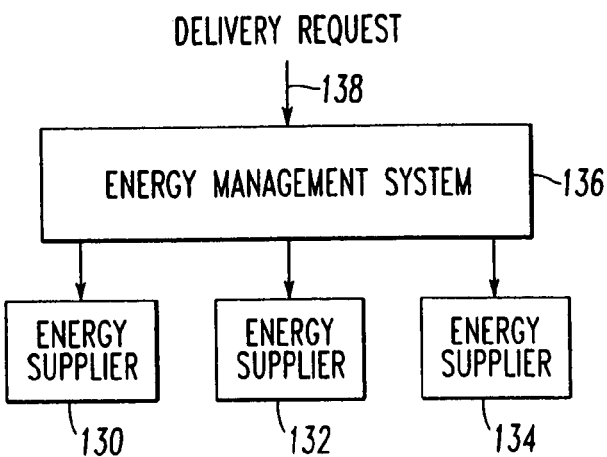
FIG. 6 is a block diagram showing synergy of energy suppliers and an energy management system.

FIGS. 6-9 show various exemplary mechanisms for automated profitability optimization of energy suppliers. Referring to FIG. 6, a synergy of three exemplary energy suppliers 130,132,134 and an exemplary energy management system 136 is shown. The energy management system 136 is requested by a delivery request 138 (from another EMS or from energy consumers) to provide a certain amount of energy over a given period of time in compliance with a specification framework (e.g., a request for proposal or bid to provide various energy output/services). The energy suppliers 130,132,134 are collectively able to provide the requested output/services. Preferably, the energy suppliers 130,132,134 employ the energy planning interface 104 of FIG. 5 and the energy management system 136 employs the energy planning system 76 of FIG. 4.

Although the intervening interfaces between the exemplary energy suppliers and the exemplary energy management systems disclosed herein may employ either human/machine or machine/machine communication, the latter form of communication is preferably employed for automated optimization. As discussed in greater detail below, these interfaces apply self-structuring principles to energy alliances. This enables energy suppliers to offer and negotiate prices and services without revealing seasonally variable or otherwise proprietary information (e.g., operating parameters) worth protecting in regard to issues affecting energy prices and services. This permits the dynamic design of energy service pricing as a function of output requirements, demand, and internal operating parameters, and under application of local optimization (e.g., by employing variable rates). Furthermore, energy management systems may employ suitable mechanisms for handling the specification of energy service inquiries (e.g., requests for proposals), for the selection of optimal partial energy services from a number of offers to selected energy suppliers (e.g., procurement), and for combining such partial energy services in a locally, regionally or globally optimized energy service package (e.g., aggregation).

Figure 7:
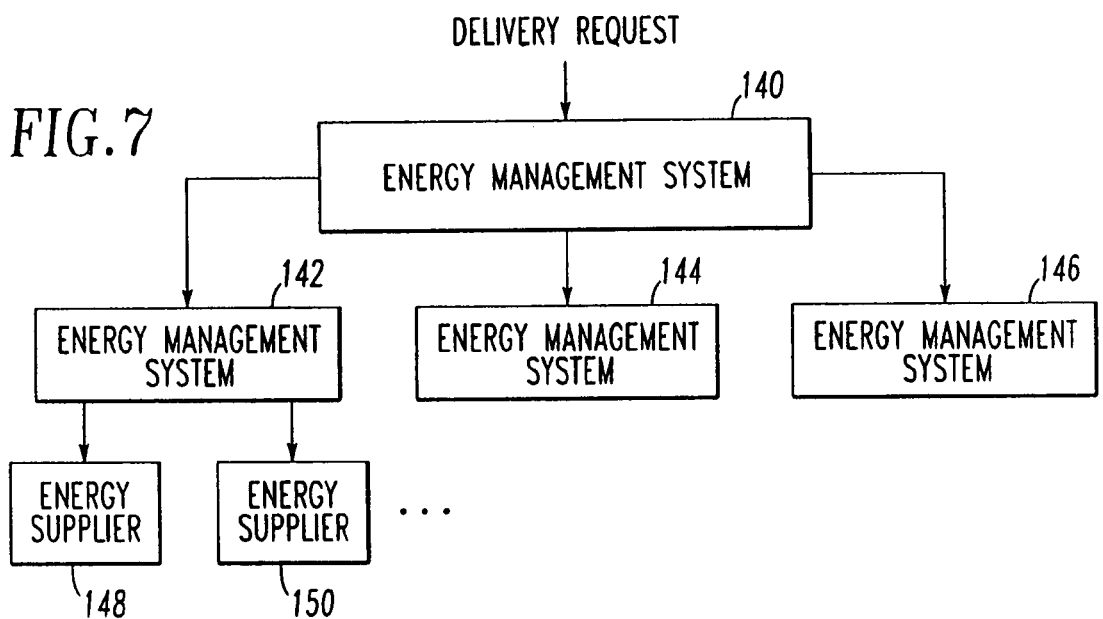
FIG. 7 is a block diagram showing synergy among energy management systems, which, in turn, are integrated into a larger energy alliance.

FIG. 7 shows synergy among four energy management systems 140,142,144,146, which are integrated into a larger energy alliance with two or more energy suppliers, such as 148,150. The hierarchical cascading capability of the system and method disclosed herein permits a self-replicating format. For example, each energy management system, such as 142, may play the role of an "energy supplier" for the energy services/output it offers, while simultaneously forming a part of a more comprehensive energy alliance with the other energy management systems 140,144,146. Hence, the energy management system 142, for example, might choose to present itself to the energy management system 140 as an "energy supplier".

FIG. 8 summarizes the exemplary interface between an energy supplier 152 and an energy management system 154. The interface typically provides two related steps of: (1) inquiry processing; and (2) contract processing. These steps deal with request for proposal, proposal, offer, and acceptance (or counter offer) phases and refer to an "energy specification", which describes what the two parties are expecting or offering during a contract negotiation.

The inquiry processing step includes: (a) receiving, at 156, an inquiry or request for proposal (RFP) (e.g., RFP 10 of FIG. 1) from the energy management system 154 to the energy supplier 152, and (b) sending, at 158, a proposal from the energy supplier 152 to the energy management system 154. At 156, the energy supplier 152 receives the specification of energy services to be provided in the RFP. In response, the energy supplier 152 processes the inquiry by: (i) employing a feasibility analysis (e.g., determining whether all the energy services can be provided, or whether some of such services might be excluded for various reasons such as, for example, availability, capacity or existing commitments to other customers); (ii) calculating pricing for the energy services by employing various internal parameters (e.g., operating ratio, a planned load schedule (i.e., the amount of energy over time that a power source expects to deliver to one or more energy consumers)); and (iii) preparing the proposal for the energy services (e.g., including a term of validity of the proposal).

The contract processing step may include: (a) (i) receiving an acceptance, at 159, of the proposal, thereby forming a contract (i.e., there was no change to the energy specification), or (a) (ii) receiving an offer (e.g., a modification to the energy specification), at 160, after which internal resources are allocated (i.e., such resources are then no longer available for other RFPs). The latter step is followed by either: (b) (i) accepting, at 162, the offer (i.e., confirming the contract), or (b) (ii) providing a counter offer (e.g., with modifications), at 164. The latter step, in turn, is followed by further negotiation with the energy management system 154. Finally, after the contract is formed, there is the step of reporting on service performance, at 166. In exceptional cases, there is reporting, at 168, on variances due to, for example, faults (e.g., power outages).

FIG. 9 shows the interface between the energy management system 154 and the energy supplier 152 of FIG. 8, from the perspective of the energy management system 154. The interface also typically provides the two related steps of: (1) inquiry processing; and (2) contract processing.

First, in the inquiry processing step, there is a formulation of the-energy services to be provided in response to an external request for proposal (RFP) 170 (e.g., from another energy management system (not shown)). Of course, with a plurality of energy suppliers (e.g., as shown in FIG. 6), the energy management system 154 would approach all of the energy suppliers assigned to the system with corresponding RFPs. In this example, only the single energy supplier 152 is shown. The inquiry processing step includes: (a) sending, at 172, an inquiry or request for proposal (RFP) from the energy management system 154 to the energy supplier 152, and (b) receiving, at 174, a proposal from the energy supplier 152 to the energy management system 154. Upon receipt of the proposal(s) of the energy supplier(s), there is the evaluation of the proposal(s) and the selection of one or more suppliers. For example, the energy management system 154 may design an optimal plan for packaging the overall energy services resulting from various proposals. Hence, this method may efficiently select the lowest priced proposal(s) and/or determine several energy suppliers that provide better value in combination (e.g., an optimization strategy).

Next, the contract processing step may include: (a) (i) sending an acceptance, at 175, of the proposal, thereby forming a contract (i.e., there was no change to the energy specification), or (a) (ii) sending an offer (e.g., a modification to the energy specification), at 176. The latter step is followed by either: (b) (i) receiving an acceptance of the offer, at 178 (i.e., confirming the contract), or (b) (ii) receiving a counter offer (e.g., with modifications), at 180. The latter step, in turn, is followed by further negotiation with the energy supplier 152. Finally, after the contract is formed, there is the step of receiving a report on service performance, at 180. In exceptional cases, there is the step of receiving of a report, at 184, on variances. This is followed by processing of the reports concerning the normal completion or unexpected termination of the energy service delivery. Alternatively, letters or other suitable communications of refusal are sent to the non-selected energy suppliers.

Preferably, care is taken that offers or refusals are sent in a transactional manner (all or nothing). If an EMS negotiates with different suppliers to fulfill energy consumers' requests, and one supplier is unable to commit, then all other contracts would have to be re-negotiated. Hence, contracts (commitments) are closed after the last proposal is available. Also, counter offers are not worse (measured by the metrics provided) than the initial proposal. This represents a "nested transaction," as requested by a "three way handshake" (e.g., messages 96, 100, and 102/74 of FIG. 4).

Preferably, contracts are formed for energy services with the best energy suppliers according to an optimization strategy (e.g., optionally indicating a cost center to be charged for the agreed price upon delivery; brokering energy services to third parties).

Referring to FIGS. 10, 11A–11B, 12 and 13A–13H, FIG. 10 shows exemplary attributes, types of values, and importance values for the various requests for proposal, proposals, offers and counter offers of FIGS. 8 and 9. These exemplary attributes describe various aspects of power deliverables from an energy supplier (or an energy management system), although a wide range of counts of these and other suitable attributes may be employed. In this regard, the energy supply specifications 92 of FIG. 4 and 112 of FIG. 5, for example, may include a plurality of energy supply sub-specifications each of which is associated with one of the exemplary attributes of FIG. 10 having a value and an importance value.

The exemplary types of values include, for example, curves and limits, and may be expressed, for example, in terms of integers, real numbers and percentages, although the invention is applicable to a wide range of value types.

The exemplary importance values are employed to indicate how the exemplary energy management systems and energy suppliers rate the corresponding attribute during negotiations involving an energy supply specification. In the exemplary embodiment, the importance values have a nominal value of 1.0, and range from about zero (e.g., 0.1) for low importance to about two for high importance, although the invention is applicable to a wide range of importance values suitable for specifying preferences for a wide range of energy-related attributes in an energy supply specification.

Employing importance values is a typical technique applied by decision support methodologies such as, for example is Kepner Tregoe® of Kepner-Tregoe and Associates, Inc., or Quality Function Deployment (QFD)) of the QFD Institute. This methodology allows decisions to be made despite conflicting requirements due to different priorities.

The various attributes of FIG. 10 are selected from the perspective of the energy consumer (e.g., as represented by an energy management system) and/or from the perspective of the energy supplier. The different values for the energy attributes provide certain benefits and/or detriments to the energy consumer and/or to the energy supplier. Attributes may be associated with any suitable type of energy-related value (e.g., a minimum or maximum value or limit, such as a phase limit or noise limit; a percentage; a distance; an integer; a real number).

A particular type of value, a curve, is employed to show a functional relationship between an independent value (e.g., X) and a related dependent value (e.g., Y). Curves may be represented by a plot 190 (as shown in FIG. 11A), by a tabular representation of a curve, such as a table 192 (as shown in FIG. 11B), by polynomial expressions, or by any suitable mathematical representation or other tabular expression. For example, FIGS. 11A and 11B show "x" and "X" in terms of time, and "y" and "Y" in terms of power, respectively.

Figure 13A:
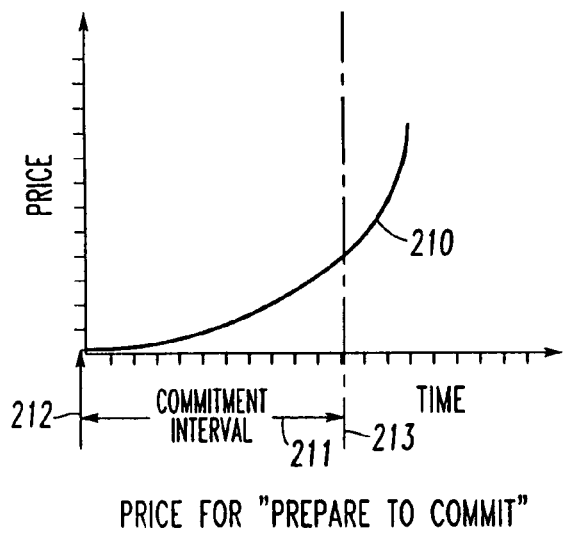
FIG. 13A is a plot or curve showing the price for a commitment interval versus time.
Figure 13B:
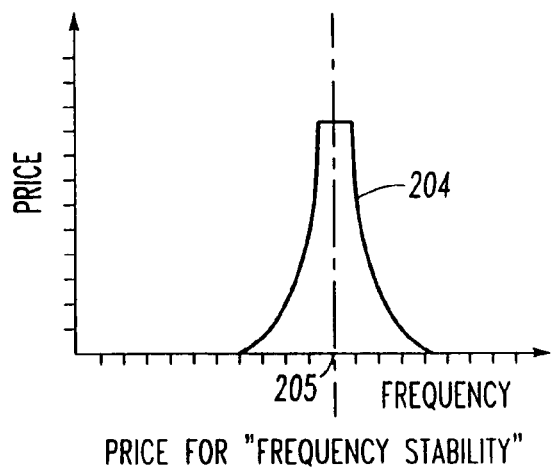
FIG. 13B is a plot or curve showing the price for frequency stability versus units of frequency.
Figure 13C:
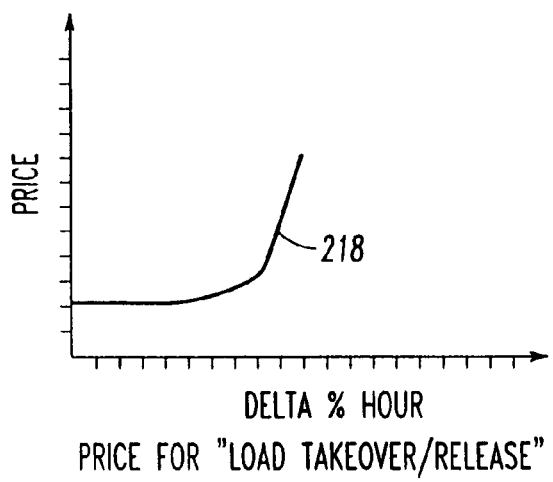
FIG. 13C is a plot or curve showing the price for load takeover/release versus the percent change in load per hour.
Figure 13D:
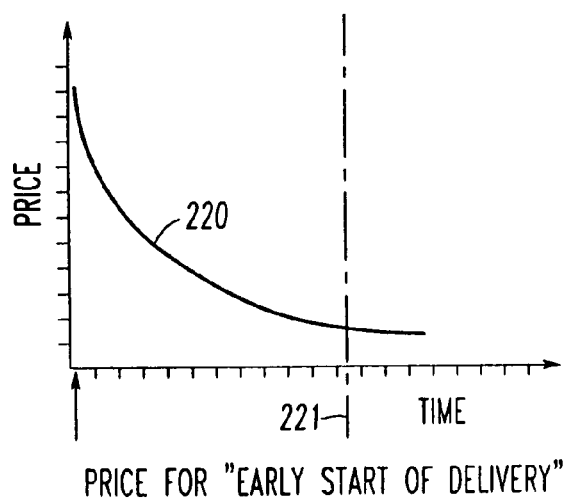
FIG. 13D is a plot or curve showing the price for early start of delivery versus the start of delivery time.
Figure 13E:
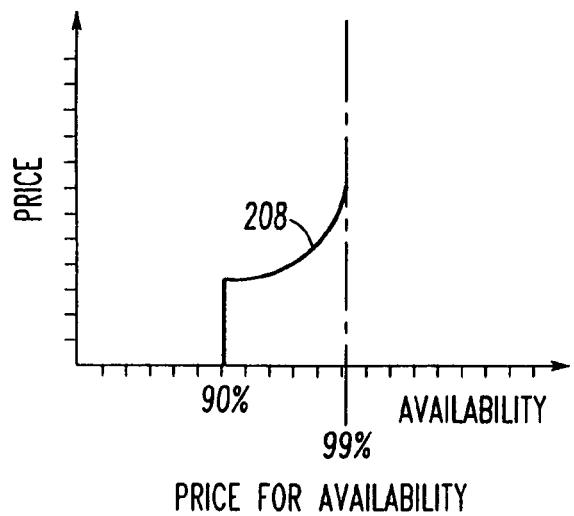
FIG. 13E is a plot or curve showing the price for availability versus the percentage of availability of the power supply.
Figure 13F:
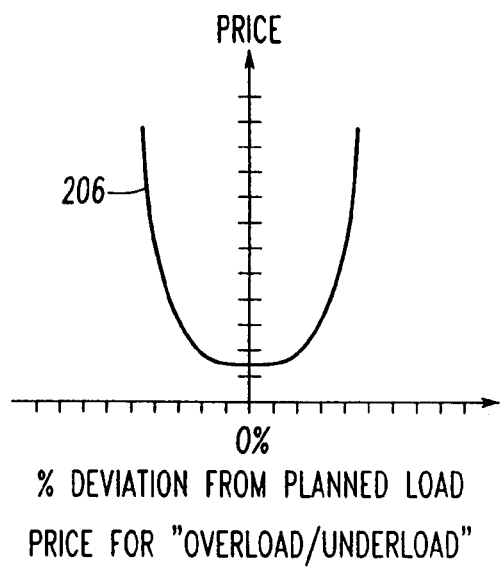
FIG. 13F is a plot or curve showing the price for over/underload versus a percent deviation from planned load.
Figure 13G:
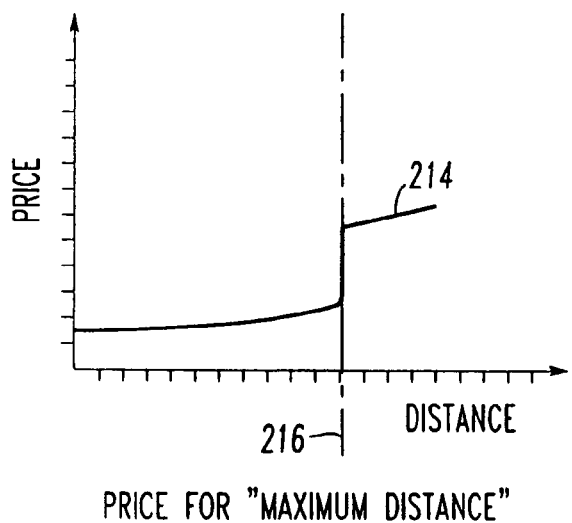
FIG. 13G is a plot or curve showing the price for a maximum distance versus distance, which includes a technology threshold value.
Figure 13H:
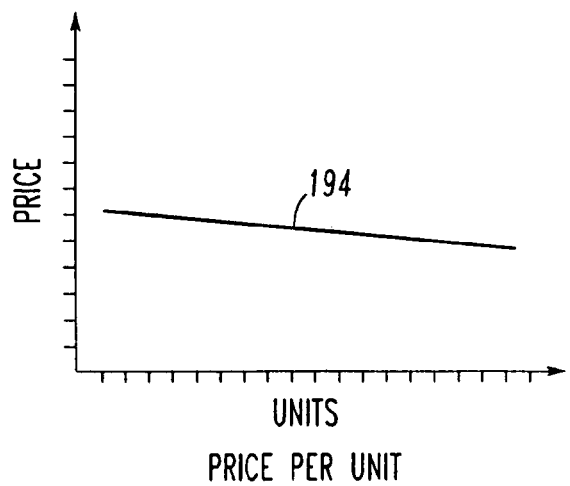
FIG. 13H is a plot or curve showing the price of power versus units of power.

As shown in FIGS. 13A–13H, a wide range of exemplary curves or plots may be employed to show various relationships between two or more energy-related variables. The Price Per Unit curve 194 (FIG. 13H) (e.g., a function of price of power or energy from a corresponding energy supplier versus an amount of the power or energy) indicates how price varies in relation to ordered (or supplied) power or energy quantities. This attribute allows both parties (e.g., the energy management system and the energy supplier) to express their view on what is the "most economic" power or energy quantity under given circumstances (e.g., the need for a minimum or maximum amount of power, the need for a minimum or maximum price). FIG. 13H shows a specific example of one Price Per Unit curve 194, which contains a rebate (i.e., a drop in price with increasing units).

The Required Power Profile curve 196 of FIG. 12 shows the amount of power, needed or offered, over time and/or date. This exemplary curve 196 includes a "start of delivery" time 198, an "end of delivery" time 200, and shows the amount of power therebetween 202 (as best shown in phantom line drawing, which is shifted upward for clarity). For example, there are various tradeoffs since energy consumers tend to just order the quantity needed (e.g., energy is difficult and dangerous to store), while energy suppliers tend to keep their power generation equipment utilized in a continuous operation. For example, from the perspective of the energy supplier, the curve 196 shows a function of an amount of power to be supplied versus time, while from the perspective of the energy management system, such a curve shows a function of an amount of power which is needed to be supplied versus time.

The Price for Frequency Stability curve 204 of FIG. 13B shows, from the perspective of the energy consumer, an expression of the value (i.e., price) associated with alternating current (AC) line frequency stability (e.g., precise frequency stability is needed for certain clocks and AC drives; frequency instability may adversely affect certain frequency sensitive processes). Alternatively, the energy supplier may employ such a curve to express the costs associated with keeping the AC line frequency stable. For example, large power plants (with a relatively small count of generators) may tend to be more frequency stable than a relatively large count of small power plants, which deliver the same amount of energy in coupled operation. Hence, there is a likely tradeoff between the needs of the energy supplier and the energy consumer. In this instance, the energy supplier might determine, for example, a suitable approach for providing the economically best deliverable to most energy consumers. As shown in the example of FIG. 13B, the curve 204 is a function of price for frequency stability versus frequency of the power to be supplied from the energy supplier. Here, the nominal price is normally within a narrow range around a center frequency 205 (e.g., 60 Hz in the United States, 50 Hz within most of Europe).

For the energy consumer, it is difficult to express the exact amount of power that may be needed over time. In contrast, for the energy supplier, it is difficult to handle a large bandwidth of power demand without prior notice (e.g., there is the need for the preparation of fuel, management of water). As shown in FIG. 13F, the Price for Over/Underload curve 206 is a function of price for a change in power to be supplied from a corresponding energy supplier versus a percentage change in the power over time. This curve quantifies the needs and capabilities in order to provide an economic tradeoff between the parties in terms of the price for over/underload versus the percent deviation from the planned load. For example, the exemplary price is relatively low for supplied power at about 100% of the planned load (i.e., 0% deviation), but significantly increases above and below certain over/underload threshold(s).

Energy consumers tend to require power at a relatively high rate of availability (e.g., energy consumers might desire less than about one hour of unplanned power outage(s) per year). Otherwise, power, without a certain amount of availability, is nearly worthless. This requires that the energy suppliers provide a sufficient amount of redundancy in power generation and distribution equipment, which is costly. As shown in FIG. 13E, each party may express a Price for Availability curve 208, which is a function of price for availability of power delivery from an energy supplier versus availability of the power delivery, in order to negotiate a suitable compromise. In this example, the price rapidly drops below a certain availability threshold (e.g., 90% availability), rapidly increases above a certain availability threshold (e.g., 99% availability), and increases with increasing availability therebetween.

Reactive power is created by inductive loads in power distribution networks. Reactive power loads generators and transmission equipment of the energy supplier, but does not do any real work. Hence, energy suppliers seek to avoid supplying reactive power, while energy consumers may influence its generation. Nevertheless, it costs money (e.g., investment in counter measures by energy consumers) to avoid reactive power. Therefore, the responsibility for handling reactive power may be shifted between the energy consumer and the energy supplier based upon price. Hence, both parties might commit, for example, to a certain percentage limit of the power factor (i.e., the ratio of true power or watts to apparent power or volt amps) in terms of a minimum phase limit value (e.g., 0.9). For example, a low power factor is usually associated with motors and transformers. An incandescent bulb has a power factor of about 1.0, while a one HP motor has a power factor of about 0.80. Thus, the parties might negotiate a limit of reactive power in the energy supplied by the energy supplier to the energy consumer. Alternatively, the parties might employ a power factor price curve, plot or table (not shown) of price versus various power factor values.

Electronic equipment on the side of the energy supplier or the energy consumer (or in between these parties) may cause AC power line noise (e.g., transient peaks, high frequencies) which can disturb other electronic equipment. Hence, both parties can express their expectations about the proper level for a Noise value in terms of one or more percentages. Thus, this value provides a limit of the noise in the energy supplied from the energy supplier to the energy consumer. Alternatively, the parties might employ a noise price curve, plot or table (not shown) of prices versus various noise values.

The amount of noise in a signal is computed, or example, as the ratio of frequencies that are normally expected within the signal (e.g., the AC power in this case with a base frequency of 60/50 Hz). This is done by computing a frequency spectrum (e.g., by applying Fourier transformation), aggregating the spectral lines of all signal components in the signal, aggregating all unwanted signal parts (adding the amplitudes of the spectral lines), which gives noise and all the wanted signal parts (which gives signal),.and dividing signal by noise, which usually gives a relatively large number. The signal to noise ratio is a measure of "cleanness" of a signal.

In the exemplary embodiment, the energy consumer (as represented by the energy management system) may need a commitment for a power "contract" for the duration of the exemplary negotiation phase (e.g., if an energy supplier provides a proposal in response to a request for proposal, then, in this example, that energy supplier must be prepared to deliver power to the energy consumer). In this manner, the energy consumer can ensure that the energy supplier delivers the requisite power if the proposal is accepted. Hence, the energy consumer may "lock" power resources to a contract during the negotiation phase, in order to guarantee the delivery of power. This, however, costs the energy consumer money (e.g., the energy supplier is not able to use its resources for other contracts, since they are dedicated to that particular energy consumer).

On one hand, this limits the time that an energy supplier is willing to have its proposal "open" (e.g., not accepted, not modified, not rejected). On the other hand, an energy consumer (i.e., as represented by the energy management system) may avoid closing (e.g., accepting, modifying, rejecting) a proposal too early, since that consumer might get better terms during the extended time of a negotiation. Hence, a value function may be employed for an "open proposal" to make these decisions quantifiable. FIG. 13A shows an exemplary Price for "Prepare To Commit" curve 210, which is a function of price for a commitment interval versus time for the energy management system to commit to an energy supplier's proposal. The exemplary curve 210 includes a commitment interval 211, and shows that increases in the commitment interval between the current time 212 (e.g., the time of the proposal) and the commitment time 213, are associated with exponential increases in price.

Hence, as discussed above in connection with FIG. 5, for the energy supply specification 122 corresponding to the proposal message 96, the energy supplier 108 is committed to supply energy in accordance with that proposal. In consideration for that commitment, the price paid by the energy management system 106 is determined from the curve 210 of the proposal message 96 (or the RFP message 94) and the time that the energy management system 106 takes (e.g., the time between the messages 96 and 100) to commit to the proposal.

The energy supplier may not (and need not) know who is the ultimate energy consumer (as contrasted with the energy management system). Nevertheless, delivery of electrical energy is subject to technical restrictions concerning distance (e.g., IR losses). Sometimes, certain transmission and distribution distances require technological changes (e.g., a change from AC to DC since, depending upon the AC frequency, above a certain distance, a power conductor will function as an antenna) which may or may not be possible for a certain energy supplier. As shown in FIG. 13G, there is a corresponding Price for Maximum Distance curve 214, which is a function of price for a distance between an energy supplier and a corresponding energy consumer versus the distance. The exemplary curve 214 includes a step change in price at a corresponding value of the distance, which is a technology threshold value 216 (e.g., a particular distance in km). For example, the price in this curve 214 generally increases with distance, and, at the technology threshold 216, there is a steep increase (or step change) in price.

Providing a relatively large amount of energy relatively quickly is technically difficult (e.g., heavy masses must be moved, boilers must be heated) and, thus, there is a cost of providing energy quickly. Hence, energy consumers who do not really need that behavior are not willing to pay the corresponding price. By quantifying this need, both the energy supplier and the energy management system may find the economically optimal gradient for starting up or shutting down the power delivery process. FIG. 13C shows an exemplary Price For Load Takeover/Load Release curve 218, which provides a function of price for an overload or an underload of planned power delivery from an energy supplier versus a deviation from the planned power delivery. In this example, the price is relative constant for relatively small values of the percent change in load per hour. However, at above a certain threshold value at the knee of the curve 218, the price increases significantly. The curve 218 may be employed for both load takeover and load release. Alternatively, the same or a similar curve may be employed in separate load takeover and load release curves, such as the Price For Load Release and Price For Load Takeover curves of FIG. 10.

There are certain environmentally conscious energy consumers who prefer hydroelectric, wind or photovoltaic power (i.e., regenerative or renewable energy) as compared to, for example, fossil or nuclear power due to their philosophy of life. Hence, there are energy suppliers that offer that kind of power for a relatively higher rate. Thus, part of the energy contract may include a percentage of renewable power (e.g., the Green Power value or a limit of an amount of power produced from renewable energy sources for energy supplied from a corresponding energy supplier to the energy consumer) in the energy deliverable. For example, the energy management system and the energy supplier may agree that at least 50% of the power would originate from renewable power sources.

If power is required relatively quickly, then it may be difficult for an energy supplier to provide it as needed (e.g., generators might be undergoing maintenance, lakes may be dry). As shown in FIG. 13D, there is an exemplary Price for Early Start Of Delivery curve 220, which is a function of price for early start of power delivery from a corresponding energy supplier versus a time of the start of power delivery (e.g., as measured from the time of the contract). For example, as the start of the delivery time decreases, the price for that early start of delivery increases at an exponential rate. On the other hand, at the relatively late time 221, the price is relatively small.

Referring again to the Required Power Profile curve 196 of FIG. 12, during the negotiation phase, the energy supplier and the energy management system both keep the negotiation open with an option to close the transaction and then fulfill the contract if both parties reach an agreement. If there is no agreement, then the energy management system, which issued the RFP, can refrain from ordering the power. Alternatively, if the contract is not as proposed, then the energy supplier can cancel or rollback the transaction. As shown in FIG. 12, the energy supplier may need some initial time to prepare to deliver (i.e., before the start of delivery 198) and, then, ramp up its generators during the load takeover time 222. Then, within the subsequent plateau phase, the energy supplier is able to cope with a certain percentage of deviation (i.e., an overload 224 and an underload 226) in the actual load 228 without violating other contract issues (e.g., availability, noise). The delivery stops with an exemplary load release phase 230 in which there is a load shift to other energy consumers or, alternatively, the power plant is shutdown.

FIGS. 14A–14D show an exemplary scenario for negotiating the requirements for power delivery. For example, an energy management system 240 of FIG. 14A is employed to provide power from two energy suppliers 242,244 as specified in a delivery request 245 from one or more energy consumers. The exemplary Price per Unit curve 246 of FIG. 14B has an importance value of 1.8 and provides a volume rebate (i.e., price decreases with power units, as shown). The exemplary Required Power Profile curve 248 of FIG. 14C has an importance value of 1.0 and employs some initial time before the starting time (and date), a reasonable ramp, a plateau phase, a release phase, and an ending time (and date). The exemplary Price for Early Start of Delivery curve 250 of FIG. 14D has an importance value of 0.5, but (unlike the curve 220 of FIG. 13D) a curve is not specified in this example (i.e., the energy management system is prepared to accept proposals, which specify that price).

As shown in FIG. 14A, in response to the external delivery request 245, the energy management system 240 employs two RFPs 252,254 to ask the energy suppliers 242,244, respectively, for proposals. The energy management system 240 hands over a specification it received (e.g., in the delivery request 245), which may be modified by the system 240 to include additional amounts of power to ensure that the proposal satisfies the relevant energy customer(s).

FIGS. 15A–15D and 16A–16D show the proposal phase for the exemplary scenario of FIGS. 14A–14D in which the two energy suppliers 242,244 react to the respective RFPs 252,254 from the energy management system 240 in different manners (e.g., due to their different histories, circumstances, cost positions). For example, the energy supplier 242 of FIG. 15A provides relatively higher costs per unit (i.e., without volume rebate) as shown in the exemplary Price per Unit curve 256 of FIG. 15B, but is able to provide nearly immediate supply, as shown by the exemplary Required Power Profile curve 258 of FIG. 15C, as required by the energy management system 240 for no additional cost for early delivery, as shown by the exemplary Price for Early Start of Delivery curve 260 of FIG. 15D. In this example, the energy supplier 242 has energy "on stock". In turn, the energy supplier 242 provides these energy supply sub-specifications as part of the proposal 261 to the energy management system 240.

In contrast, the energy supplier 244 of FIG. 16A has a relatively lower rate per unit (i.e., with rebate), as shown in the exemplary Price per Unit curve 262 of FIG. 16B, but is not able to deliver at once, as shown by the exemplary Required Power Profile curve 264 of FIG. 16C, as required by the energy management system 240. Furthermore, the energy supplier 244 requires some price, as shown by the exemplary Price for Early Start of Delivery curve 266 of FIG. 16D, for an early start of delivery. In this example, the energy supplier 244 needs advance notification, but tailors delivery and price to the customer. The energy supplier 244 similarly provides its energy supply sub-specifications as part of the proposal 267 to the energy management system 240.

In these examples, the energy suppliers 242,244 do not need to have an acceptance of the proposals 261,267, in order to make those proposals. All that these suppliers need is a suitable specification from the energy management system 240 (e.g., one that is equitably identical for both), which contains sufficient information for purpose of providing the corresponding proposals 261,267 to that energy management system. The proposal curves of FIGS. 15B–15D and FIGS. 16B–16D for the respective energy suppliers 242 and 244, thus, are responsive and correspond to the respective RFP curves of FIGS. 14B–14D.

For convenience of reference, FIGS. 17A–17C show combined plots of the price curves of FIGS. 15B–15D and 16B–16D, respectively. In turn, FIGS. 18A–18C show optimized plots for the specification of energy as determined by the energy management system 240 of FIG. 14A from the two different sets of proposed price curves of FIGS. 17A–17C, respectively. These optimized plots are employed in the computation of the resulting offer(s), which the energy management system 240 provides to one or both of the energy suppliers 242,244 for the exemplary scenario. The energy management system 240 compares both proposals 261,267 from the respective energy suppliers 242,244 according to the following exemplary principles.

First, the energy management system 240 preferably employs an evaluation routine, such as evaluation routine (EVAL) 91 of FIG. 4, to compare both proposals 161,267 with the required specification of the RFPs 252,254 according to each attribute of interest. For example, this may be done mathematically in the evaluation routine 91 by employing "least square root" metrics on each of the curves of interest.

In order to obtain "least square root" metrics for the deviation of a curve from a given curve, the following algorithm is employed for each point in both curves y1(x) and y2(x): (1) compute $(y1(x)-y2(x))^2$ (the square of the difference); (2) add all these values; and (3) get the square root of the sum: $\sqrt{(\Gamma((y1(x)-y2(x))^2)}$. For curves that can be approximated by infinitesimally small increments of x, this gives a value that shows how close the two curves are to one another.

Next, each of the resulting metrics for each of the attributes is multiplied by the importance value of the respective attribute. In turn, the importance-adjusted attribute metrics are added and an efficient energy supply specification is determined therefrom.

The routine 91 of FIG. 4 generates the energy supply specification 92 for each of the energy suppliers 78. The energy supply specification 122 includes a plurality of energy supply sub-specifications each of which has an attribute with a value and an importance value. As discussed below, the routine 91 determines a metric for each of the attributes, multiplies the importance value and the metric to determine an importance-adjusted attribute metric for each of the attributes, and adds the importance-adjusted attribute metrics for determination of the efficient energy supply specification 92 from the energy suppliers 78.

For example, the result $(R_1)$ for the first ($1^{st}$) energy supplier 242 of FIG. 14A is:

$$R_1 = \Box A_1 = \Box (AI_1 * AM_1)$$

wherein:
$\Box$ is a summation of the importance-adjusted attribute metrics (e.g., from i=1 to i=n=3 in the example of FIGS. 14A–14D);
$A_1$ is the importance-adjusted attribute metric;
$AI_1$ is the attribute importance value; and
$AM_1$ is the attribute metric (e.g., which is based upon the differences between the specifications of the RFP 252 and the corresponding proposal 261 of FIG. 15A).

The difference between the results $R_1$, $R_2$ for the respective first and second energy suppliers 242,244 is a value that describes which one of the corresponding proposals 261,267 is closer to the requirements of the respective RFPs 252,254 (and by how much). In turn, this value may be employed to select the "best fit" from exactly one of the energy suppliers 242,244.

Alternatively, rather than selecting the economically best fit, a combination of energy deliverables from both of the energy suppliers 242,244 may preferably be selected. (as is shown in FIGS. 18A–18C). Here, the energy management system 240 decides to use energy supplier 242 for covering the first part of the required power profile at 268 of FIG. 18B, since this is the only one of the energy suppliers, which is able to meet the requirements, although the cost is relatively expensive as shown at 270 of FIG. 18A. Later, when the energy supplier 244 is able to supply power (at a relatively economical cost as shown at 272 of FIG. 18A), the energy management system 240 switches, as soon as possible, to the energy supplier 244, as shown at the second part of the required power profile at 274 of FIG. 18B, and stops using the energy supplier 242. Hence, this involves less expense, even if the energy management system 240 must pay a premium for the early start of delivery from energy supplier 242. Later, the energy management system 240 saves costs by employing the relatively lower price per unit and the volume rebate from energy supplier 244.

In the foregoing example, the calculations may be accomplished by optimization theory (e.g., linear algebra) in order to find the best mix and match point between the various energy suppliers.

FIGS. 19A–19D and 20A–20D show the resulting offers 276,278 from the energy management system 240 to the respective energy suppliers 242,244, for the exemplary scenario. Here, the optimal contract specifications for both energy suppliers 242,244 are calculated before the offers 276,278 are presented. In this example, the energy suppliers 242,244 do not negotiate further by offering counter offers (e.g., step 164 of FIG. 8), but, instead, commit to and accept the contracts (e.g., step 162 of FIG. 8). In this instance, the energy suppliers 242,244 charge the corresponding "prepare to commit" price from a corresponding Price for "Prepare To Commit" curve (e.g., FIG. 13A) for the commitment intervals 280,282 of FIGS. 19D,20D, respectively, and prepare to deliver power.

In turn, as soon as the delivery is completed at 284 and 286 (of FIGS. 19C and 20C) (e.g., with or without deviation due to over or under load), the energy suppliers 242 and 244 report the delivery in messages 288 and 290 (of FIGS. 19A and 20A) using the corresponding attributes of the energy supply specification (e.g., actual price per unit based on units delivered; actual power profile performed; actual charges for early start of delivery, if applicable).

As shown by the exemplary scenario, the manner in which the energy supply specification is denoted and interpreted (e.g., attributes, pricing functions, constraints, importance values) by the involved energy supplier and energy management system allows all parties to optimize, on their own behalf, while still providing benefits to both parties. This provides a "global optimization strategy" while leaving ample room for local optimization. This creates self-organization of large structures, without disrupting local organization, and cellular integrity by giving organizations outside the local organization access to local information (e.g., in contrast to an information hiding principle).

For suitable function of the exemplary energy supply negotiation method, the interfaces between the energy supplier and the energy management system are suitably described in terms of semantics (e.g., the RFP and proposal specifications) and the dynamics (e.g., allowing reasonable dynamic changes to the energy supply specifications of the requests, proposals and offers on a meaningful basis). The benefits of the exemplary method are sufficiently shown with the exemplary energy-related parameters disclosed herein, although further benefits are possible by employing other suitable parameters known to those skilled in the art.

The exemplary energy supply negotiation method is suitable for use in connection with the exemplary systems in which there is: (1) one energy management system and one energy supplier or power plant (e.g., FIGS. 8 and 9); (2) one energy management system and a plurality of energy suppliers or power plants (e.g., FIGS. 6 and 14A); (3) a plurality of energy management systems and one energy supplier or power plant (e.g., similar to FIG. 7, but without energy supplier 150); (4) a plurality of energy management systems and a plurality of energy suppliers or power plants (e.g., FIG. 7); (5) a plurality of energy management systems among themselves (e.g., similar to FIG. 7, but without energy suppliers 148,150); and (6) one power plant system with several sub-components (e.g., turbo sets) as shown in FIG. 21.

Figure 21:
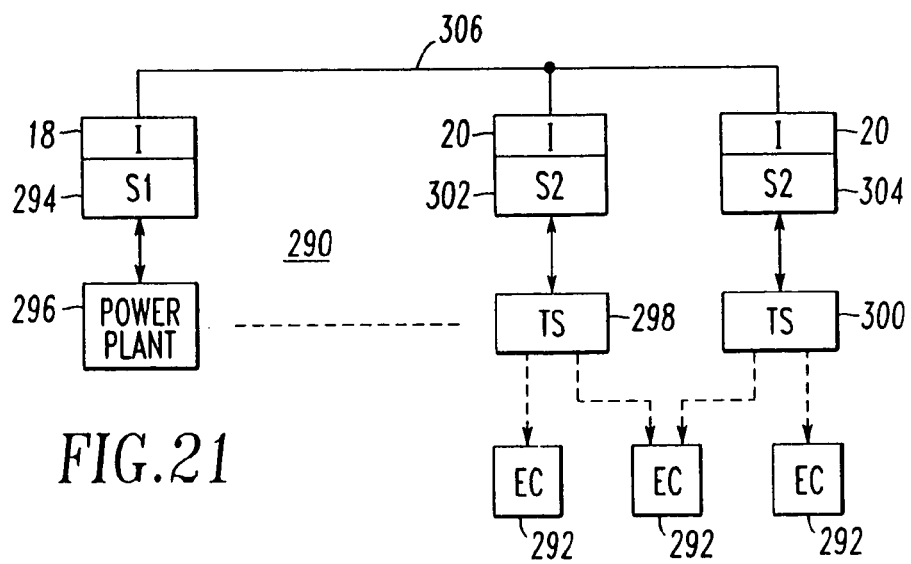
FIG. 21 shows a single power plant system with several sub-components (e.g., turbo sets).

As shown in FIG. 21, a system 290 for planning energy supply for energy consumers 292 includes a first sub-system 294 operatively associated with an energy supplier, such as the exemplary power plant 296. The power plant 296 has a plurality of energy sources, such as the exemplary turbo sets (TS) 298,300. The system 290 also has a plurality of second sub-systems 302,304, each of which is operatively associated with one of the energy sources 298,300, respectively. A suitable communication network, such as the local area network (LAN) 306 is disposed between the first and second sub-systems 294,302,304. Similar to the system 2 of FIG. 1, each of the first and second sub-systems 294 and 302,304 includes an interface 18 and 20, respectively, for exchanging energy planning information between the sub-systems 294, 302,304 and for negotiating an energy supply specification for the energy consumers 292.

With the energy planning system and method disclosed herein, energy consumer benefits include: (1) a better overall operating ratio of the combined energy system with the same installed equipment base; and (2) a more flexible and dynamic energy offering in a "deregulated market", thus, increasing competition among energy suppliers and energy management systems. Benefits to energy suppliers include: (1) differentiation of various competitive energy suppliers by means of: (a) a built-in "value added" "smart" energy source, and (b) a stronger market profile as a party to energy solutions beyond the traditional services/output provided by one power plant; and (2) optimal deployment of several power plants.

In accordance with one embodiment of the present invention, certain energy performance profile(s) are requested from one or more energy suppliers, regardless of how efficiently the energy suppliers can meet these profiles (e.g., a supply/provision process rather than a control process is employed). In this embodiment, the local optimization potential of intelligent power plant units is not maximized, although some degree of enhanced profitability is achieved in a larger environment (e.g., in an alliance system). Hence, the ultimate energy consumer does not receive the maximum economic advantage.

In another embodiment of the present invention, the local optimization potential may be advantageously utilized by employing: (1) a "Solution" component (e.g., as part of the range of energy services) in order to achieve value optimization within a power plant group with the existing resources of one power plant by employing a suitable planning procedure; (2) an "Alliance Optimization" component for the alliance of energy management systems that provides alliance optimization in conjunction with the internal management systems of the individual power plants; and (3) a "Profitability Optimization" component (e.g., a software interface) in the power plant control technology of each power plant, which negotiates the output to be supplied by the relevant power plant with the energy management system according to profitability criteria.

In the Solution model, power plants are built that allow better utilization by negotiating different power sources within that plant (e.g., turbo sets) and, thus, enhancing profitability (with the same machinery). This provides value as a component bundled to a power plant.

In the Alliance Optimization model, "optimization gear" is sold to power plant owners to make the most money out of the existing power plants, without installing more or better power sources. Instead, the power plants are balanced in a better way.

For the Profitability Optimization model, the Solution model is sold as a retrofit to owners already having power plants in place. This enhances profitability in conjunction with energy management systems in place by being able to balance the different operational parameters (wear and tear under high or alternating load) with the demands of energy consumers' needs for flexibility in purchasing energy.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A system for planning energy supply for energy consumers, said system comprising:

a first sub-system operatively associated with at least one energy coordinating body;

a second sub-system operatively associated with at least one energy supplier; and a communication network between said first sub-system and said second sub-system, wherein each of said first and second sub-systems includes an interface, each interface operatively associated with a processor configured to execute one first automated software routine for exchanging energy planning information between said sub-systems and one second automated software routine for negotiating an energy supply specification from said at least one energy supplier to said energy consumers.

2. The system as recited in claim 1, wherein said communication network includes a first local area network and a first ICCP server operatively associated with said first sub-system, a second local area network and a second ICCP server operatively associated with said second sub-system, and a global communication network between said first and second ICCP servers.

3. The system as recited in claim 1, wherein said communication network is a global communication network.

4. The system as recited in claim 3, wherein said global communication network is the Internet.

5. The system as recited in claim 1, wherein said at least one energy coordinating body is an energy management system.

6. The system as recited in claim 1, wherein said at least one energy supplier is a power plant.

7. The system as recited in claim 1, wherein the interface of each of said first and second sub-systems provides communications between said processors for automated optimization of energy supply planning.

8. The system as recited in claim 7, wherein the one first automated software routine exchanges at least two messages between the first and second sub-systems, the at least two messages comprising a request message for a proposal for the energy supply specification from the at least one energy supplier related to a request for energy and a proposal message for the energy supply specification from the at least one energy supplier; and wherein the one second automated software routine exchanges at least two messages between the first and second sub-systems, the at least two messages comprising an offer message for the energy supply specification in response to the proposal message and one selected from the group consisting of an acceptance message for accepting the offer message and a counter-offer message for a modification to the offered energy supply specification.

9. The system as recited in claim 8, wherein the one second automated software routine evaluates the received proposal message to determine an efficient energy supply specification from the at least one energy supplier.

10. The system as recited in claim 1, wherein said energy supply specification includes a plurality of energy supply sub-specifications.

11. A system for planning energy supply for energy consumers, said system comprising:

a first sub-system operatively associated with a first energy management system;

a plurality of second sub-systems, each of said second sub-systems being operatively associated with a corresponding second energy management system; and a communication network between said first sub-system and said second sub-systems, wherein each of said first and second sub-systems includes an interface, each interface operatively associated with a processor configured to execute one first automated software routine for exchanging energy planning information between said sub-systems and one second automated software routine for negotiating an energy supply specification for said energy consumers.

12. A system for planning energy supply for energy consumers, said system comprising:

a first sub-system operatively associated with an energy supplier having a plurality of energy sources;

a plurality of second sub-systems, each of said second sub-systems being operatively associated with a corresponding one of said energy sources; and a communication network between said first sub-system and said second sub-systems, wherein each of said first and second sub-systems includes an interface, each interface operatively associated with a processor configured to execute one first automated software routine for exchanging energy planning information between said sub-systems and one second automated software routine for negotiating an energy supply specification for said energy consumers.

13. The system as recited in claim 12, wherein said energy supplier is a power plant having a plurality of turbo sets; and wherein said energy sources are the turbo sets of said power plant.

14. An energy planning system for planning energy supply from a plurality of energy suppliers for energy consumers, said system comprising:

a communication interface to said energy suppliers;

a processor operatively associated with said communication interface;

a first automated software routine executed by said processor for exchanging energy planning information through said communication interface between said processor and said energy suppliers; and a second automated software routine executed by said processor for negotiating an energy supply specification from said energy suppliers to said energy consumers.

15. The energy planning system as recited in claim 14, wherein the first automated software routine exchanges at least two messages between the processor and a corresponding one of said energy suppliers, the at least two messages comprising a request message for a proposal for the energy supply specification from the corresponding one of said energy suppliers related to a request for energy and a proposal message for the energy supply specification from the corresponding one of said energy suppliers; and wherein the second automated software routine exchanges at least two messages between the processor and the corresponding one of said energy suppliers, the at least two messages comprising an offer message for the energy supply specification in response to the proposal message and one selected from the group consisting of an acceptance message for accepting the offer message and a counter-offer message for a modification to the offered energy supply specification.

16. An energy planning interface to an energy management system for use in planning energy supply from an energy supplier for energy consumers, said energy planning interface comprising:

a communication interface to said energy management system;

a processor operatively associated with said communication interface;

a first automated software routine executed by said processor for exchanging energy planning information through said communication interface between said processor and said energy management system; and a second automated software routine executed by said processor for negotiating an energy supply specification from said energy supplier to said energy consumers.

17. The energy planning interface as recited in claim 16, wherein the first automated software routine exchanges at least two messages between the processor and the energy management system, the at least two messages comprising a request message for a proposal for the energy supply specification relaxed to a request for energy and a proposal message for the energy supply specification; and wherein the second automated software routine exchanges at least two messages between the processor and the energy management system, the at least two messages comprising an offer message for the energy supply specification in response to the proposal message and one selected from the group consisting of an acceptance message for accepting the offer message and a counter-offer message for a modification to the offered energy supply specification.

18. A method of planning energy supply, said method comprising the steps of:

employing at least one energy coordinating body;

employing at least one energy supplier;

receiving and coordinating requests for energy at said at least one energy coordinating body;

exchanging energy planning information relaxed to said requests for energy between said at least one energy coordinating body and said at least one energy supplier; and negotiating an energy supply specification responsive to said requests for energy and from said at least one energy supplier, wherein a processor operatively associated with a communication interface to the at least one energy coordination body executes a first automated software routine for the exchanging step and a second automated software routine for the negotiating step.

19. The energy supply planning method as recited in claim 18, wherein the first automated software routine exchanges at least two messages between the at least one energy coordinating body and the at least one energy supplier, the at least two messages comprising a request message for a proposal for the energy supply specification related to a request for energy and a proposal message for the energy supply specification; and wherein the second automated software routine exchanges at least two messages between the at least one energy coordinating body and the at least one energy supplier, the at least two messages comprising an offer message for the energy supply specification in response to the proposal message and one selected from the group consisting of an acceptance message for accepting the offer message and a counter-offer message for a modification to the offered energy supply specification.

20. A method of planning energy supply, said method comprising the steps of:

employing at least one energy coordinating body;

employing at least one energy supplier;

receiving requests for energy from a global communication network at said at least one energy coordinating body;

employing said global communication network to exchange energy planning information related to said requests for energy between said at least one energy coordinating body and said at least one energy supplier; and employing said global communication network to negotiate an energy supply specification from said at least one energy supplier and responsive to said requests for energy, wherein a processor operatively associated with a communication interface to the at least one energy coordinating body executes a first automated software routine for exchanging energy planning information related to said requests for energy between said at least one energy coordinating body and said at least one energy supplier and a second automated software routine for negotiating the energy supply specification from said at least one energy supplier and responsive to said requests for energy.

21. The method as recited in claim 20, further comprising employing the Internet as said global communication network.

22. The energy supply planning method as recited in claim 20, wherein the first automated software routine exchanges at least two messages between the at least one energy coordinating body and the at least one energy supplier, the at least two messages comprising a request message for a proposal for the energy supply specification related to a request for energy and a proposal message for the energy supply specification; and wherein the second automated software routine exchanges at least two messages between the at least one energy coordinating body and the at least one energy supplier, the at least two messages comprising an offer message for the energy supply specification in response to the proposal message and one selected from the group consisting of an acceptance message for accepting the offer message and a counter-offer message for a modification to the offered energy supply specification.

* * * * *

UNITED STATES PATENT AND TRADEMARK OFFICE
CERTIFICATE OF CORRECTION

PATENT NO.       : 7,171,287 B2                                      Page 1 of 1
APPLICATION NO. : 10/733492
DATED            : January 30, 2007
INVENTOR(S)      : Anton Weiss It is certified that error appears in the above-identified patent and that said Letters Patent is hereby corrected as shown below:

<u>Title page:</u> item [63]
Add "Related U.S. Appln. Data"
--Continuation of appln. no. 09/671,916, filed on Sep. 28, 2000, now Pat. No. 6,681,156.--

<u>Col. 17:</u>
Line 14: "relaxed" should read --related--.
Line 31: "relaxed" should read --related--.
Lines 39-40: "coordination" should read --coordinating--.

Signed and Sealed this

Second Day of October, 2007

JON W. DUDAS
*Director of the United States Patent and Trademark Office*